US011893336B1

(12) United States Patent
Chokhani et al.

(10) Patent No.: US 11,893,336 B1
(45) Date of Patent: Feb. 6, 2024

(54) UTILIZING TRANSITION ATPG TEST PATTERNS TO DETECT MULTICYCLE FAULTS AND/OR DEFECTS IN AN IC CHIP

(71) Applicant: CADENCE DESIGN SYSTEMS, INC., San Jose, CA (US)

(72) Inventors: Arvind Chokhani, Murphy, TX (US); Joseph Michael Swenton, Owego, NY (US); Martin Thomas Amodeo, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 288 days.

(21) Appl. No.: 17/499,414

(22) Filed: Oct. 12, 2021

(51) Int. Cl.
*G06F 30/398* (2020.01)
*G06F 119/18* (2020.01)
*G06F 119/12* (2020.01)

(52) U.S. Cl.
CPC ........ *G06F 30/398* (2020.01); *G06F 2119/12* (2020.01); *G06F 2119/18* (2020.01)

(58) Field of Classification Search
CPC ............... G06F 30/398; G06F 2119/12; G06F 2119/18; G01R 31/31858; G01R 31/318328; G01R 31/318342; G01R 31/31833; G01R 31/318555; G01R 31/318307; G01R 31/318314
USPC ........................................................ 716/136
See application file for complete search history.

(56) References Cited

U.S. PATENT DOCUMENTS

| | | | |
|---|---|---|---|
| 6,327,684 B1 * | 12/2001 | Nadeau-Dostie | G01R 31/31858 714/731 |
| 9,086,454 B2 | 7/2015 | Lin et al. | |
| 10,372,853 B2 | 8/2019 | Douskey et al. | |
| 11,579,194 B1 * | 2/2023 | Chokhani | G01R 31/318342 |
| 2003/0084413 A1 | 5/2003 | Varney | |
| 2005/0172192 A1 | 8/2005 | Han | |
| 2013/0232459 A1 | 9/2013 | Wohl et al. | |
| 2015/0323600 A1 | 11/2015 | Lin et al. | |
| 2017/0024508 A1 * | 1/2017 | Mneimneh | G06F 30/398 |
| 2020/0279064 A1 | 9/2020 | Boutobza et al. | |

OTHER PUBLICATIONS

Rith Pomeranz, "Target Faults for Test Compaction Based on Multicycle Tests"; ACM Trans. Des. Autom. Electron. Syst. 25, 2, Article 18 (Jan. 2020), 14 pgs.; https://doi.org/10.1145/3375278.

* cited by examiner

*Primary Examiner* — Paul Dinh
(74) *Attorney, Agent, or Firm* — Foley & Lardner LLP

(57) ABSTRACT

An IC test engine generates a plurality of two-cycle delay test patterns that target a first set of multicycle faults and/or defects of a fabricated IC chip based on an IC design. Each two-cycle delay test pattern includes a scan-in shift window operating at a test clock frequency, and a capture window with a launch cycle and a capture cycle operating at a functional clock frequency. The IC test engine fault simulates the plurality of two-cycle delay test patterns against a second set of multicycle faults and/or defects in the IC design utilizing sim-shifting, such that a state of the IC design after at least a last two shift clock cycles of a scan-in shift in window of each two-cycle delay test pattern of the plurality of two-cycle delay test patterns are fault simulated to provide two fault initialization cycles for detection of a multicycle delay fault and/or defect.

20 Claims, 10 Drawing Sheets

UTILIZING TRANSITION ATPG TEST PATTERNS TO DETECT MULTICYCLE FAULTS AND/OR DEFECTS IN AN IC CHIP

TECHNICAL FIELD

This disclosure relates to testing integrated circuit (IC) chips. More particularly this disclosure relates to utilizing transition ATPG test patterns to detect multicycle faults and/or defects present in an IC chip.

BACKGROUND

As IC chip complexity increases, meeting the testing requirements for acceptable quality assurance is becoming increasingly difficult. Automated testing involves applying test signals to each manufactured circuit in various patterns designed to detect defects that cause improper circuit behavior. Although most modern integrated circuits comprise a number of interconnected cells selected from a library, early testing schemes assumed that faults occurred only between cell instances, at the cell I/O ports, or elsewhere outside cells altogether. The test patterns generated therefore did not necessarily include those needed to detect circuit faults inside a cell.

ATPG (acronym for both Automatic Test Pattern Generation and Automatic Test Pattern Generator) is an electronic design automation method/technology used to find an input (or test) sequence that, when applied to a digital circuit, enables automatic test equipment to distinguish between the correct circuit behavior and the faulty circuit behavior caused by defects. The generated patterns are used to test semiconductor devices after manufacture, or to assist with determining the cause of failure. The effectiveness of ATPG systems is measured by the number of modeled defects, or faults, detectable and by the number of generated patterns. These metrics generally indicate test quality (higher with more fault detections) and test application time (higher with more patterns). ATPG efficiency is another consideration that is influenced by the fault model under consideration, the type of circuit under test (full scan, synchronous sequential, or asynchronous sequential), the level of abstraction used to represent the circuit under test (gate, register-transfer, switch), and the required test quality.

A defect is an error caused in a device during the manufacturing process. A fault (alternatively referred to as a fault model) is a mathematical description of how a defect alters design behavior. The logic values observed at the device's primary outputs, while applying a test pattern to some device under test (DUT), are called the output of that test pattern. The output of a test pattern, when testing a fault-free device that works exactly as designed, is called the expected output of that test pattern. A fault is said to be detected by a test pattern if the output of that test pattern, when testing a device that has only that one fault, is different than the expected output. The ATPG process for a targeted fault has two phases: fault activation and fault propagation. Fault activation establishes a signal value at the fault model site that is opposite of the value produced by the fault model. Fault propagation moves the resulting signal value, or fault effect, forward by sensitizing a path from the fault site to a primary output and/or an observable scan flop.

A standard cell is a group of transistor and interconnect structures that provides a Boolean logic function (e.g., AND, OR, NOR, NAND, XOR, XNOR, inverters) or a storage function (flipflop or latch). The simplest cells are direct representations of the elemental NAND, NOR and XOR Boolean function, although cells of much greater complexity are commonly used (such as a 2-bit full-adder, or muxed D-input flipflop). The cell's Boolean logic function is called its logical view: functional behavior is captured in the form of a truth table or Boolean algebra equation (for combinational logic), or a state transition table (for sequential logic).

Scan chains are the elements in scan-based designs of IC chips that are used to shift-in and shift-out test data. A scan chain is formed by a number of observable scan flops connected back to back in a chain with the output of one observable scan flop connected to another. The input of a first observable scan flop is connected to the input pin of the chip (called scan-in) from where scan data is fed. The output of the last observable scan flop is connected to the output pin of the chip (called scan-out) which is used to observe or measure the data shifted out. Output pins of the IC chip can be directly observed with automatic test equipment (ATE).

An observable scan flop or observable scan flip-flop (SFF) in a scan chain is a muxed input master-slave based D flip-flop. In other words, an observable scan flop is a D flip-flop that allows its input to come from a data port (D) or from an alternative source, namely, as scan-input (SI) port. A scan-enable signal (SE) controls each scan flop. More particularly, if the scan-enable signal is asserted (e.g., logical 1), the scan flop passes data received at the scan-input (SI) port to an output port (Q) of scan flop. Conversely, if the scan-enable signal is de-asserted (e.g., logical 0), the scan flop passes data received at the data port (D) to the output port. In this manner, a scan flop is employable in a scan chain to test an IC chip, and is employable for functional operation of the IC chip.

SUMMARY

One example relates to a non-transitory machine-readable medium having machine-readable instructions. The machine-readable instructions comprising an IC test engine that generates a plurality of two-cycle delay test patterns that target a first set of multicycle faults and/or defects of a fabricated IC chip based on an IC design. Each two-cycle delay test pattern includes a scan-in shift window operating at a test clock frequency, and a capture window with a launch cycle and a capture cycle operating at a functional clock frequency that is greater than the test clock frequency. The IC test engine also fault simulates the plurality of two-cycle delay test patterns against a second set of multicycle faults and/or defects in the IC design utilizing sim-shifting, such that a state of the IC design after at least a last two shift clock cycles of the scan-in shift window of each two-cycle delay test pattern of the plurality of two-cycle delay test patterns are fault simulated to provide two fault initialization cycles for detection of a multicycle delay fault and/or defect.

Another example relates to a system including a non-transitory memory that stores machine-readable instructions and a processing unit that accesses the memory and executes the machine-readable instructions. The machine-readable instructions include an IC test engine that generates a plurality of two-cycle delay test patterns that target a first set of multicycle faults and/or defects of a fabricated IC chip based on an IC design. Each two-cycle delay test pattern includes a scan-in shift window operating at a test clock frequency, and a capture window with a launch cycle and a capture cycle operating at a functional clock frequency that is greater than the test clock frequency. The IC test engine also fault simulates the plurality of two-cycle delay test patterns against a second set of cell-aware multicycle faults and/or defects in the IC design that are based on a plurality of fault rules files for the IC design utilizing sim-shifting such that a state of the IC design after at least a last two shift clock cycles of the scan-in shift window of each two-cycle delay test pattern of the plurality of two-cycle delay test patterns are fault simulated to provide two fault initialization cycles for detection of a multicycle delay fault and/or defect. Each of the plurality of fault rules files is associated with a respective cell type of a plurality of cell types in the IC design, and a given two-cycle delay test pattern of the plurality of two-cycle delay test patterns is sim-shifted to enable detection of a given multicycle fault and/or defect of the second set of cell-aware multicycle faults and/or defects.

Yet another example relates to a method for generating test patterns for testing a fabricated IC chip. The method includes generating, by an IC test engine executing on a computing platform, a plurality of two-cycle delay test patterns that target a first set of multicycle faults and/or defects of a fabricated IC chip based on an IC design. Each two-cycle delay test pattern includes a scan-in shift window operating at a test clock frequency, and a capture window with a launch cycle and a capture cycle operating at a functional clock frequency that is greater than the test clock frequency. The method also includes fault simulating, by the IC test engine, the plurality of two-cycle delay test patterns against a second set of multicycle faults and/or defects in the IC design utilizing sim-shifting such that a state of the IC design after at least a last two shift clock cycles of the scan-in shift window of each two-cycle delay test pattern of the plurality of two-cycle delay test patterns are fault simulated to provide two fault initialization cycles for detection of a multicycle delay fault and/or defect, wherein a given two-cycle delay test pattern of the plurality of two-cycle delay test patterns is sim-shifted to enable detection of a given multicycle fault and/or defect of the second set of multicycle faults and/or defects.

BRIEF DESCRIPTION OF THE DRAWINGS

FIG. 3A illustrates an example of a defect detection matrix (DDM) for a cell with two-cycle delay test patterns.

FIG. 3B illustrates an example of another DDM for a cell with three-cycle delay test patterns.

DETAILED DESCRIPTION

Figure 1:
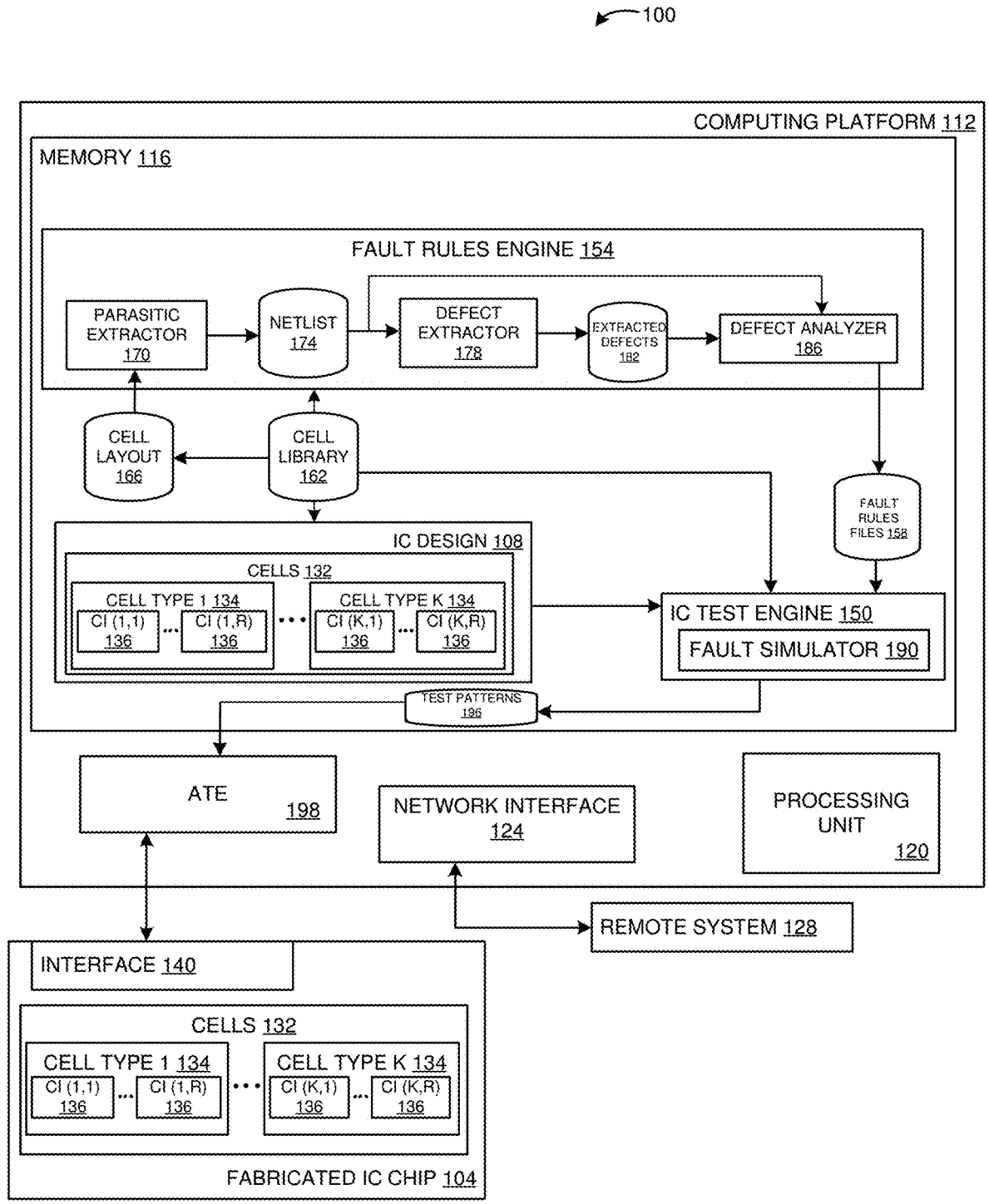
FIG. 1 illustrates an example of a system for testing a fabricated IC chip that is based on an IC design.

This disclosure relates to a system for employing ATPG techniques to generate multicycle test patterns for an IC chip design. A test pattern targets candidate faults/defects of the IC design. Some test patterns, referred to as boundary model test patterns, test a candidate fault/defect at a boundary of a cell of the IC chip, where faults/defects can be referred to as boundary model fault/defects. Other test patterns, referred to as cell-aware test patterns test for a candidate fault/defect inside a cell of the IC chip, where defects can be referred to as cell-aware defects. Cell-aware defects can be physically correlated to actual observed fabrication errors. For instance, bridge defects that can cause an unintended short or low-resistance connection, and open defects that can cause an unintended disconnection, for example are typically of highest interest. For example, an open wire can cause a missing contact of a transistor. Such missing contacts are conventionally only detectable with a multicycle test pattern with at least three cycles in a capture window. The cell-aware test patterns are based on a plurality of fault rules files for the IC design. Each of the fault rules files is associated with a respective cell type of a plurality of cell types in the IC design.

In the examples provided, an IC test engine employs ATPG techniques to generate the test patterns. Some of the test patterns can be single cycle test patterns, and other test patterns are multicycle test patterns for testing faults/defects in the IC design. A single cycle test pattern has only one clock cycle during a capture window and a multicycle test pattern has two or more clock cycles during the capture window to detect faults/defects. For each such test pattern (multicycle or single cycle), the capture window is preceded by a shift window which includes one or more scan shift cycles. A multicycle test pattern employs two or more cycles to detect faults/defects during the capture window where a scan/shift enable is typically de-asserted. In a case with two at-speed cycles in the capture window of a multicycle test pattern, the second clock cycle is defined as a capture cycle and the first cycle is defined as a launch cycle (or release cycle). There are other examples where cycles other than N−1 and N in the capture window are the launch and capture cycles respectively. In such cases, the cycles prior to launch cycles in the capture window are the fault/defect initialization cycles and cycles after the capture cycle in the capture window are fault/defect propagation cycles. The launch cycle creates the transition (fault excitation) at the fault site required to detect a fault and/or defect while the capture cycle observes the transition on a primary output or an observable scan flop. One or more shift cycles in the shift window or in the capture window sets the initial values (fault initialization cycle) which enables the creation of the transition during the launch cycle. Additionally, the last clock cycle during the capture window (capture cycle) allows observing the fault effect on a primary output or observable scan flop(s).

Conversely, a single cycle test pattern can detect static faults/defects and has only one clock cycle during the capture window where the scan/shift enable is typically de-asserted. In single cycle test patterns, the last scan shift cycle prior to the capture window sets the correct static conditions to detect a fault or defect (fault excitation) while the (single) clock cycle during the capture window (capture cycle) allows observing the fault effect on a primary output or observable scan flop(s).

As used herein, the term "two-cycle delay test pattern" refers to a multicycle test pattern where there is exactly two cycles in the capture window of the multicycle test pattern, namely, a launch cycle, and a capture cycle. That is, two-cycle delay test patterns are a subset of multicycle test patterns. Moreover, unless otherwise stated, it is presumed that each two-cycle delay test pattern includes a capture window that operates at a functional frequency of a clock signal. Furthermore, as used herein, a "two-cycle" fault/defect refers to a fault/defect of an IC chip that is detectable with a two-cycle delay test pattern.

In the examples described, the IC test engine executing on a computing platform can generate a first set of test patterns using ATPG techniques, namely a set of two-cycle delay test patterns using ATPG techniques. The two-cycle delay test patterns can target two-cycle (e.g., a particular type of multicycle) boundary model delay fault(s)/defect(s) or multicycle cell-aware fault(s)/defect(s) of an IC design. Each two-cycle delay test pattern of the set of two-cycle delay test patterns can target a particular set of multicycle boundary model delay faults/defects in the fabricated IC chip or target a particular set of multicycle cell-aware faults/defect in the fabricated IC chip. More specifically, in some examples, the two-cycle delay test patterns include two at-speed (functional clock speed) clock cycles in a capture window. Such two-cycle delay test patterns operating at functional frequency are also referred to as transition, at-speed, delay or dynamic ATPG test patterns.

The IC test engine can employ a fault simulator with sim-shifting to fault simulate the set of two-cycle delay test patterns against a second set of faults/defects in the IC design. The set of two-cycle delay test patterns are fault simulated such that the state of the IC design after at least the last two shift clock cycles of a scan-in shift window of each of the respective two-cycle delay test patterns of the plurality of two-cycle delay test patterns are fault simulated to provide two fault initialization cycles for detection of a multicycle delay fault and/or defect. The second set of faults/defects can be, for example, a set of multicycle cell-aware static defects. Additionally or alternatively, the second set of faults/defects can be multicycle cell-aware delay fault/defects (e.g., 2 or more cycles). The IC test engine can mark off the faults/defects of the second set of faults/defects that are detectable by the set of two-cycle delay test patterns (two-cycle delay test patterns that target boundary model delay faults/defects or cell-aware delay faults/defects).

More specifically, sim-shifting a two-cycle delay test pattern entails fault simulating one or more scan shift cycles prior to the launch cycle in the capture window as a fault initialization (or multiple fault initializations), employing the launch cycle as a fault excitation and employing the capture cycle as a fault observation cycle to detect a fault/defect which otherwise requires three or more clock cycles during the capture window. If the last two or more shift cycles (in the scan-in window) prior to the capture window shift values as required by a multicycle delay defect also enable the fault excitation to create the transition required to detect the fault/defect and the final state of the transition can be observed during the capture cycle, then sim-shifting results in that fault/defect detection. In this manner, a two-cycle test pattern mimics the operation of a different multicycle test pattern(s) for detecting other faults/defects, such as multicycle boundary model defects and/or multicycle cell-aware defects, such that the same two-cycle test pattern is employable to detect other multicycle fault(s)/defect(s). Stated differently, sim-shifting of the two-cycle delay test pattern enables such two-cycle delay test patterns with only two cycles in the capture window to detect other multicycle faults/defects (such as multicycle cell-aware defects) that conventionally are only detectable by a test pattern that requires three (or more) cycles in the capture window.

The systems and methods described herein enable fault simulation to recognize that two-cycle delay test patterns are employable to detect other faults/defects, including multicycle delay faults/defects that conventionally require three or more cycles in the capture window, and to assign appropriate credit to the two-cycle delay test patterns, which obviates the need to explicitly target these other faults/defects and generate unnecessary multicycle test patterns. The other fault/defects that are detectable with the two-cycle delay test patterns, which can include multicycle delay fault/defects (boundary model or cell-aware), are marked off. Marking off these fault/defects and the static multicycle cell-aware faults/defects avoids unneeded generation of test patterns specifically targeting these additional marked off faults/defects. As used herein, the term "marked off" (and its derivatives) is synonymous with "marked as tested", such that a marked off fault/defect does not need further testing.

Additionally, in some examples, the IC test engine can generate a second set of test patterns, namely a set of two-cycle top-off test patterns generated using ATPG techniques utilizing sim-shifting and targeting untested (e.g., non-marked off) cell-aware delay faults/defects. The IC test engine can employ the fault simulator to fault simulate the two-cycle top-off test patterns against untested multicycle cell-aware delay faults/defects through sim-shifting as patterns are generated. Furthermore, the IC test engine can generate a third set of test patterns using ATPG techniques. The third set of test patterns can be multicycle test patterns (that include three or more at-speed clock cycles) that target untested multicycle delay faults/defects.

The IC test engine can aggregate the two-cycle delay test patterns (the first set of test patterns), the two-cycle top off test patterns with sim-shifting (the second set of test patterns) and the third set of test patterns to provide test patterns to an ATE. Responsive to the test patterns, the ATE can apply the test patterns to the fabricated IC chip. By employing the techniques described herein, the number of faults detected by the application of the test patterns is increased without requiring an increase in the number of the test patterns.

FIG. 1 illustrates an example of a system 100 for testing a fabricated IC chip 104 that is based on an IC design 108. The system 100 can include a computing platform 112. Accordingly, the computing platform 112 can include a memory 116 for storing machined readable instructions and data and a processing unit 120 for accessing the memory 116 and executing the machine-readable instructions. The memory 116 represents a non-transitory machine-readable memory (or other medium), such as random access memory (RAM), a solid state drive, a hard disk drive or a combination thereof. The processing unit 120 can be implemented as one or more processor cores. The computing platform 112 can include a network interface 124 (e.g., a network interface card) configured to communicate with other computing platforms via a network, such as a public network (e.g., the Internet), a private network (e.g., a local area network (LAN)) or a combination thereof (e.g., a virtual private network).

The computing platform 112 could be implemented in a computing cloud. In such a situation, features of the computing platform 112, such as the processing unit 120, the network interface 124, and the memory 116 could be representative of a single instance of hardware or multiple instances of hardware with applications executing across the multiple of instances (e.g., distributed) of hardware (e.g., computers, routers, memory, processors, or a combination thereof). Alternatively, the computing platform 112 could be implemented on a single dedicated server or workstation.

The IC design 108 can be stored in the memory 116 of the computing platform 112. The IC design 108 can be implemented, for example, as design specifications for an IC chip. The IC design 108 can be generated with an electronic design automation (EDA) application operating on a remote system 128, such as a logic synthesis application (e.g., a synthesis tool). For instance, an end-user of the EDA application can employ a user-interface to generate and/or modify hardware description language (HDL) code (e.g., Verilog) for generating a register-transfer level (RTL) model (e.g., RTL code) characterizing a circuit, wherein the RTL model is transformable by an EDA application into a physically realizable gate-level netlist for the IC design 108.

As noted, in the examples described, the fabricated IC chip 104 represents a physically instantiated version of the IC design 108. More particularly, the fabricated IC chip 104 and the IC design 108 can include intellectual property (IP) blocks formed of cells 132. Each of the cells 132 (alternatively referred to as standard cells), can represent a group of transistor and interconnect structures that provides a Boolean logic function (e.g., AND, OR, NOR, NAND, XOR, XNOR, inverters) or a storage function (e.g., flipflop or latch). The cells 132 of the fabricated IC chip 104 represent physically instantiated versions of the cells 132 of the IC design 108. Thus, the cells 132 of the IC design 108 and the cells 132 of the fabricated IC chip 104 employ the same reference numbers. In many instances, there can be virtually any number of cells 132 (e.g., hundreds, thousands or millions).

In the present example, there are K number of different cell types 134 of the cells 132, where K is an integer greater than or equal to one. Additionally, there are R number of cell instances 136 for each of the K number of cell types 134, where R is an integer greater than or equal to one. Each cell instance 136 represents a specific instantiation in the IC design 108 for a corresponding cell type 134. Moreover, there can be a different (or the same) number of cell instances 136 for each of the K number of cell types 134.

For purposes of simplification of explanation, each of the cell instances 136 includes a unique identifier implemented as a two-dimensional index number, i,j, where i identifies the cell type 134 and j identifies the cell instance number for the cell type 134. For instance, the cell instance 136 labeled as CI (1,R) uniquely identifies the Rth cell instance of cell type 1. Similarly, the cell instance 136 labeled as CI (K,1) uniquely identifies the first cell instance 136 of the Kth cell type 134.

The fabricated IC chip 104 can include an interface 140 that enables external systems to provide stimuli to the components of the fabricated IC chip 104, including the cells 132 of the fabricated IC chip 104. The interface 140 can conform to the standards set forth in the IEEE 1149.1 standards, IEEE 1149.6 standards, and can be implemented with PCI, wafer probes, etc.

The memory 116 includes an IC test engine 150 which can be implemented as application software or a software module. The IC test engine 150 is configured to execute ATPG techniques to generate boundary model and cell-aware test patterns that can be applied to the fabricated IC chip 104 to ensure proper operation.

The IC test engine 150 can operate in concert with a fault rules engine 154 stored in the memory 116. The fault rules engine 154 can be configured/programmed to generate fault rules files 158. In some examples, the fault rules engine 154 generates Defect Detection Matrices (DDMs) that each represents a user-readable format of a corresponding fault rules file 158. Each fault rules file 158 represents a set of fault rules for a particular cell type 134 of the K number of cell types 134 that is selected from a cell library 162. The cell library 162 can include, but is not limited to, data characterizing a physical layout of each of the K number of cell types 134 in the cells 132 of the IC design 108 and the fabricated IC chip 104. The cell library 162 can also include structural Verilog (.v), behavioral Verilog (.v) and timing models (.lib).

To generate the fault rules files 158, the fault rules engine 154 can read a cell layout 166 from the cell library 162. The cell layout 166 corresponds to a physical layout view of the standard cell type 134 in terms of mask polygons containing the geometrical data required to instantiate the fabricated IC chip 104. The fault rules engine 154 generates a particular fault rules file 158 of the fault rules files 158 based on the cell identified in the cell layout 166.

The fault rules engine 154 can represent a plurality of software applications that operate in an ordered sequence to generate each instance of the fault rules file 158. In particular, the cell layout 166 can be received by a parasitic extractor 170. The parasitic extractor 170 generates a transistor-level netlist 174 of the cell represented by the cell layout 166. The parasitic extractor 170 utilizes the cell layout 166, along with other fabrication technology-related information available in the cell library 162 to generate the transistor level netlist 174. The netlist 174 is a textual description of the standard cell type 134 in terms of its designed devices (e.g., transistors), input output pins and their inter-connections. The netlist 174 also includes unavoidable parasitic resistors (Rs) and capacitors (Cs) inherent to a standard cell type 134 extracted by the parasitic extractor 170. The parasitic resistors, for example, can be extracted on the wires and inter-connects and for the terminals of a transistor e.g. drain, gate, source, bulk. The parasitic extractor 170 can extract parasitic capacitors between wires on the same layer (intra-layer), between layers (inter-layer) or across transistor terminals e.g. drain-gate, drain-source, bulk-drain, etc. The netlist 174 can be provided in the Detailed Standard Parasitic Format (DSPF).

The fault rules engine 154 can include a defect extractor 178 that can analyze the netlist 174 to identify parasitic resistors and capacitors to be modeled as potential open and short defects for the standard cell type 134 to provide extracted defects 182. The extracted defects 182 can include data for modeling each of the defects identified in the netlist 174. For instance, a large parasitic resistor indicates a long and thin wire segment that can undergo an unintended break, and hence is a potential 'open' defect site. A large parasitic capacitance between two nets or wire segments indicates that the two nets or wires are relatively close to one another and along a relatively long distance, hence can be potentially shorted. An open defect is modeled with a high ohmic resistance (e.g. 1 G Ohm), and a short is modeled with a very low resistance (e.g., 0.001 Ohm).

The extracted defects 182 from the netlist 174 can be provided to a defect analyzer 186 that characterizes each of the extracted defects 182 in the netlist 174. More particularly, the defect analyzer 186 simulates operation of a circuit representing the cell layout 166 for each instance of the extracted defects 182. For example, the defect analyzer 186 can simulate operation of the circuit representing a particular cell with each parasitic capacitor and/or resistor being set to a defect free value, and open or a short. The defect analyzer 186 can identify transition faults/defects as well as static faults/defects in one of the K number of cell types 134 characterized by the cell layout 166. Transition faults/defects characterize faults/defects wherein a component within the cell reaches an expected value slower than is acceptable. Conversely, static faults/defects refer to faults/defects that cause a circuit component to not reach an expected value within the typically used tester cycle period (e.g. 20 ns for a 50 MHz tester cycle). Throughout this disclosure, unless otherwise noted the faults/defects analyzed by the defect analyzer 186 refer to static faults/defects. The defect analyzer 186 outputs an instance of the fault rules file 158 based on the results of the analysis. The fault rules engine 154 can repeat operations to iteratively generate the fault rules files 158 for each cell type 134 in the K number of cell types 134.

Figure 2:
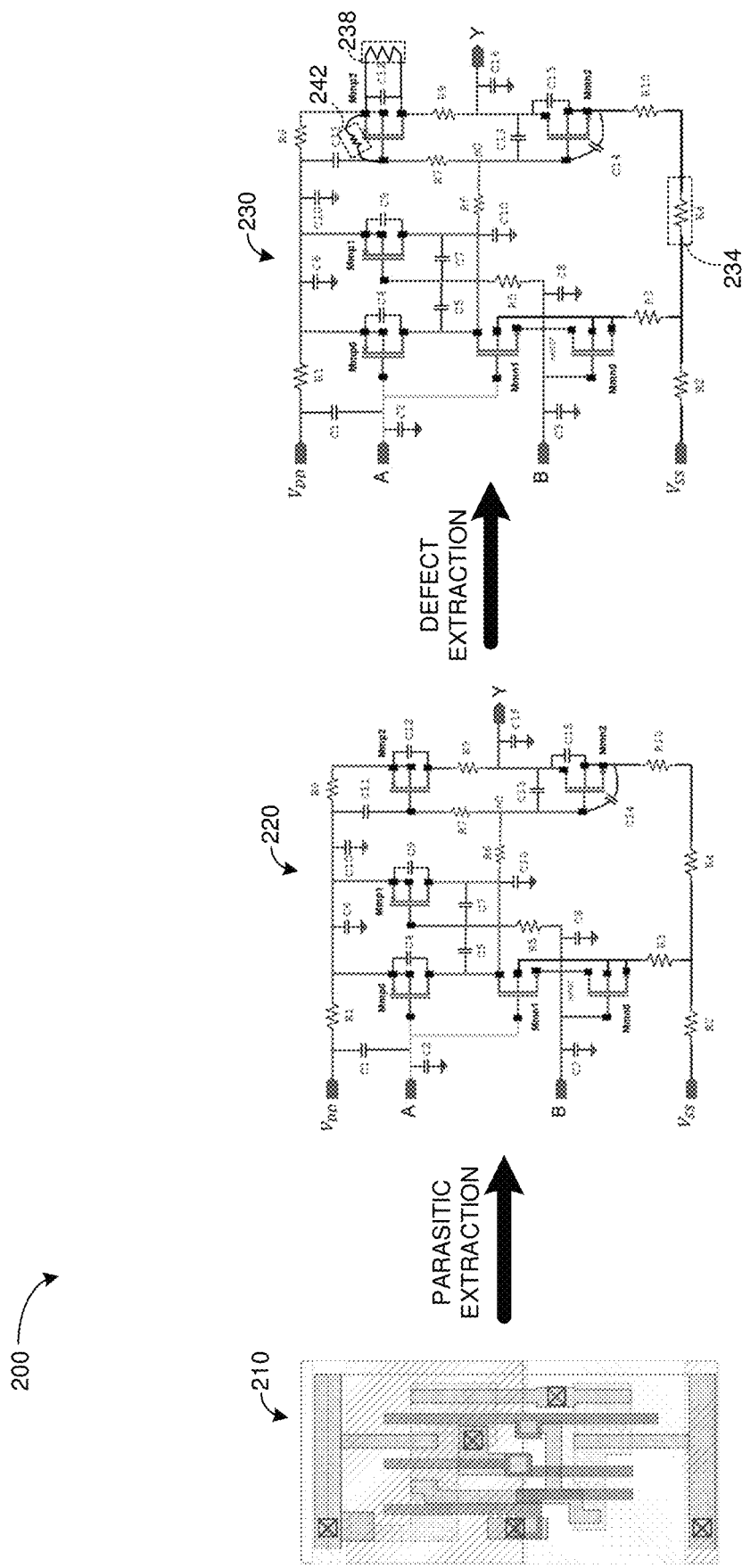
FIG. 2 illustrates diagrams depicting a flow for extracting potential faults/defects in a cell.
Figure 3A:
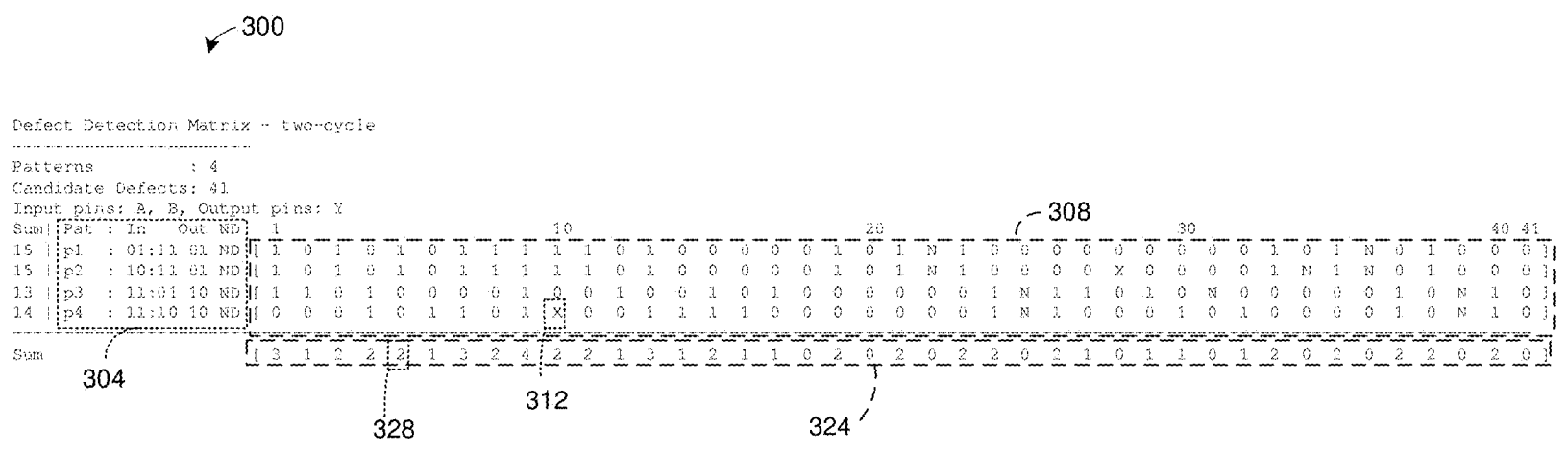
Figure 3B:
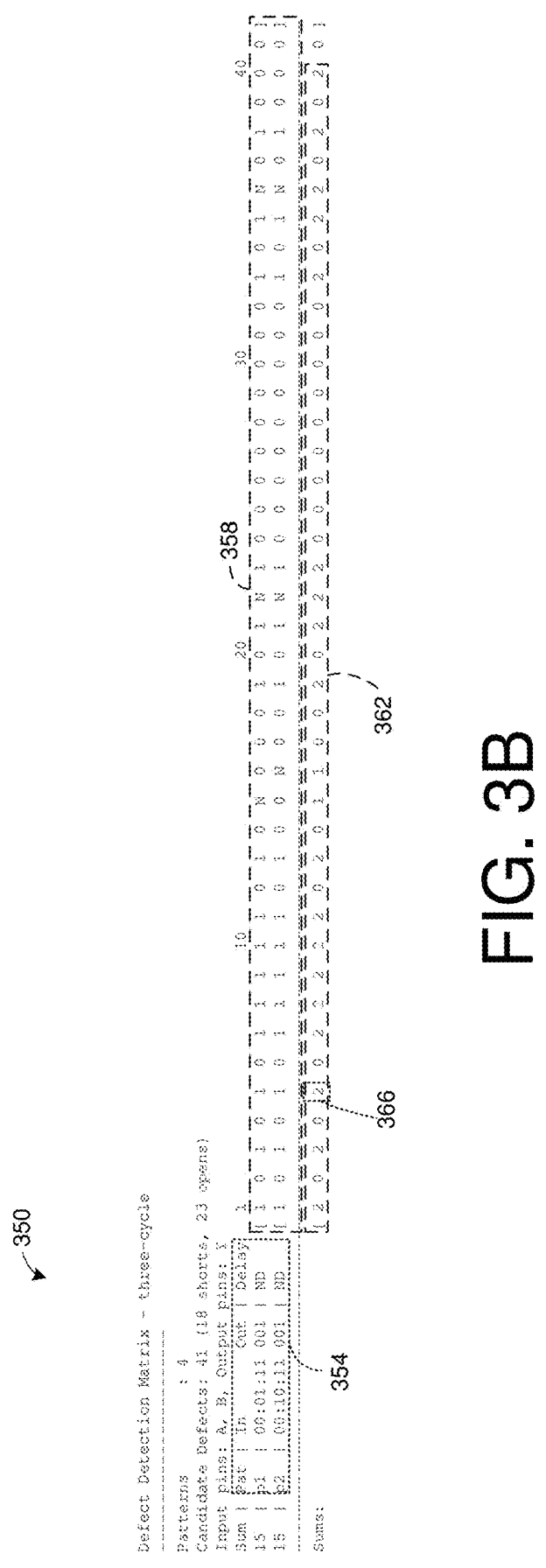
Figure 4:
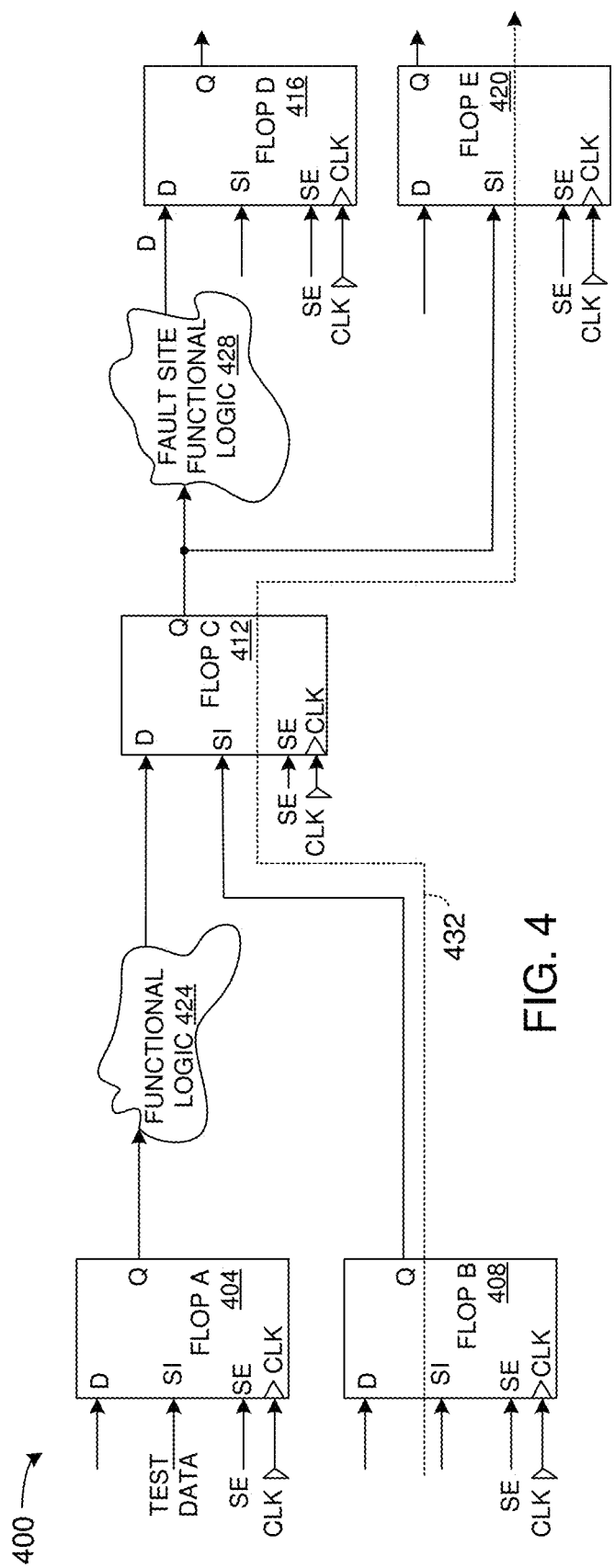
FIG. 4 illustrates an example of a scan chain for testing a candidate fault/defect in an IC design.

To facilitate understanding of the operations of the fault rules engine 154, a given extended example ("the given example") is provided and explained with respect to FIGS. 2-4. The given example illustrates and describes how a fault rules file can be generated for an AND gate cell.

FIG. 2 includes diagrams depicting a flow 200 for extracting potential defects in a cell in the given example. FIG. 2 includes a physical cell layout 210 for an AND gate. The physical cell layout 210 characterizes the physical layout of an IC chip that physically instantiates the AND gate. More particularly, the physical cell layout 210 includes connection points and traces that form the AND gate.

A parasitic extractor, such as the parasitic extractor 170 of FIG. 1 can analyze the physical cell layout 210 to generate a transistor-level netlist of the physical cell layout 210. The transistor-level netlist provides data sufficient to generate a circuit diagram 220 for the physical cell layout 210. The parasitic extractor analyzes the netlist to identify and extract parasitic components in the cell represented by the circuit diagram 220. These parasitic resistors and capacitors are not intended by the designer of the cell, but exist in a fabricated IC chip that employs the cell. Parasitic capacitance, or stray capacitance is an unavoidable (and usually unwanted) capacitance that exists because of a proximity of circuit components, such as wires, interconnects between transistor terminals, etc. Similarly, all conductors (e.g. wires, interconnects) in the physical cell layout 210 possess some unavoidable parasitic resistance. The parasitic extractor extracts (or models) these parasitic resistors and capacitors in the circuit diagram 220. In this manner, the parasitic extractor generates an accurate analog model for the physical cell layout 210 that is characterized in the circuit diagram 220, which analog model is employable to emulate circuit responses in detailed simulations of the circuit diagram 220.

The parasitic extractor identifies (marks) node in the netlist with the parasitic components that coincide with possible defect sites. Thus, the parasitic extractor augments the netlist with data that includes the identification of parasitics extracted from the netlist. In the given example, the parasitic extractor analyzes the circuit diagram 220 to provide a circuit diagram 230 that includes specific identification of a resistor R4 234 in the netlist as a parasitic component.

The netlist in DSPF that identifies parasitics that can be provided to a defect extractor, such as the defect extractor 178 of FIG. 1. The defect extractor employs the parasitics identified in the netlist to model potential open and short defects within a standard cell. More particularly, the defect extractor can analyze the identified parasitics and generate a fault model for each identified parasitic in the netlist, or some subset thereof. Additionally, the defect extractor searches the circuit diagram 220 to identify nets that are relatively long which could form a parasitic resistor and/or nets that are relatively close and running parallel over long distance, which could form a parasitic capacitor. These parasitic capacitors have a high probability of corresponding to probable short and open locations as a result of defects induced during fabrication. That is, the defect extractor can identify locations in the netlist that have a higher probability of corresponding to manufacturing defects.

The fault model for each parasitic resistor can represent an instance of a circuit design wherein a respective parasitic resistor is modeled as an open (e.g. a resistor with a resistance of 1 G Ohm). Examples of such modeled opens can include, but are not limited to opens at a drain, gate, source and bulk terminals on FETs, and opens on each branch of interconnected nets including signaling nets and between power-ground nets. Additionally, the fault model for each parasitic capacitor can be represented as an instance of the circuit design wherein a respective parasitic capacitor is modeled as a short (e.g., a resistor with a resistance of 0.001 Ohms). The examples of such modeled shorts can include, but are not limited to, shorts across FET terminal pairs, including drain-source, drain-gate, source-gate, bulk-drain, bulk-gate and bulk-source pairs. The examples of such model shorts also include shorts across each possible interconnected net pairs, signal nets on the same layer (e.g., intralayer shorts), shorts between power-ground nets (e.g., power-ground shorts) and shorts between adjacent layers (e.g., inter-layer shorts). The defect extractor can provide extracted defects, such as the extracted defects 182 of FIG. 1 that identifies the location of defects modeled by the defect extractor. In the given example, the resistor R4 234 can be modeled as an open circuit in one fault model of the circuit design. In another fault model of the circuit design, the capacitor C12 238 or the transistor terminals of MMP2 242 can be modeled as a short. That is, the defect extractor generates multiple versions of a circuit representing a cell, wherein each version (a fault model) includes an open or a short replacing a particular parasitic resistor or parasitic capacitor. During execution of this analysis, each cell is evaluated in isolation, outside of the context of the full IC design. Each cell input is assumed to be directly controllable and independent from other cell inputs. Each of the fault models can be aggregated into the extracted defects that can be provided to a defect analyzer, such as the defect analyzer 186 of FIG. 1.

The defect analyzer can employ the extracted defects characterized with fault models to generate a DDM and a fault rules file that characterizes a detectability of each fault identified in the netlist, or some subset thereof. More particularly, the defect analyzer can employ fault analysis to generate the DDM and the fault rules file for the cell. In the given example, it is presumed that there are 41 potential faults. The defect analyzer applies a set of two-cycle delay test patterns for each potential fault to determine whether a fault is detectable, and if the fault is detectable, to determine if the fault is a static defect or a delay (transient) fault. Moreover, if the fault is a static fault, the defect analyzer can determine if the fault is detectable with a multicycle test pattern or if a single cycle test pattern is needed.

In the given example, the circuit diagram 220 includes input nodes labeled A and B and an output node labeled Y. As noted, in the given example, the cell represents an AND gate. Thus, an instance of the cell with no faults/defects should provide an output of a logical one on node Y if, and only if nodes A and B have a logical one applied there-on. Additionally, node Y should output a logical 0 for all other combinations of logical values applied to nodes A and B. To generate the DDM and the fault rules file, the defect analyzer simulates instantiations of the cell that have particular faults/defects and analyzes whether a particular fault/defect impacts an output of a cell based on the application of two-cycle delay test patterns applied to the input nodes (nodes A and B in the given example). The defect analyzer can be configured to apply multiple two-cycle delay test patterns for each candidate fault/defect identified in the netlist. The results can be aggregated to form a DDM and a fault rules file for the cell.

FIG. 3A illustrates an example of a DDM 300 that could represent the cell (an AND gate) in the given example that includes two-cycle delay test patterns. In the DDM 300, a first box 304 identifies and characterizes four two-cycle delay test patterns, labeled p1 . . . p4. For instance, in the given example, the two-cycle delay test pattern p1 is labeled as (In) 01:11, (Out) 01 and (ND) "ND". This labeling indicates that in a first test pattern, a logical 0 is applied to node A, and a logical 1 is applied to node B, and that an expected response at the output node, Y is a logical 0. Additionally, this labeling also indicates that in a second test pattern, a logical 1 is applied to node A and to node B, and that the expected response at the output node, Y is a logical 1. Furthermore, the labeling "ND" of p1 represents a recorded nominal delay, Delaynom for the test pattern, p1 (e.g., the transition delay for a defect-free version of the cell). Values at "ND" are stored as integer or fixed point/floating point values. Moreover, in some examples, the nominal delay, Delaynom can be omitted.

Additionally, the DDM 300 includes a 41 by 4 results matrix 308 wherein each of the 41 columns represents a recorded result of a corresponding two-cycle delay test pattern for a particular candidate fault/defect. That is, each column represents a response to four two-cycle delay test patterns, p1 . . . p4 by a particular version of the cell where one fault/defect is modeled. Values in the results matrix 308 of the DDM 300 recorded as a 0 indicate that the particular fault/defect did not have a detectable change on the operation of a cell for a corresponding test pattern. For instance, the value stored in the results matrix 308 at column 3, row 3 indicates that the two-cycle delay test pattern p3 (11:01; 10; "ND") in the first box 304 has a value of 0. This indicates that the two-cycle delay test pattern, p3 is not employable to detect the particular candidate fault/defect modeled in column 3.

Additionally, values in the results matrix 308 of the DDM 300 recorded as a 1 indicate that the particular fault/defect is a static fault/defect detected by the corresponding test pattern. For instance, the value stored at column 4, row 4 indicates that the two-cycle delay test pattern p4 (11:10; 10; "ND") has a value of 1. This indicates that the two-cycle delay test pattern, p4 is employable to detect a static fault/defect for the particular candidate fault/defect model in column 4.

A recorded value of 'X' in the results matrix 308 indicates that the corresponding test pattern is not employable to detect a fault/defect caused by the candidate fault/defect of the corresponding column due to non-convergence, where the solution from fault analysis was indeterminant. Furthermore, in the given example, the value at column 10, row 4 in a second box labeled 312 is set to 'X', indicating that due to non-convergence, the two-cycle delay test pattern p4 is not employable to detect a fault/defect caused by the particular candidate fault/defect modeled in column 10. Further, a recorded value of 'N' represents a percent deviation or a time deviation (e.g., in µs, ns or ps) from a corresponding nominal delay 'ND' caused by applying a corresponding test pattern for a particular candidate fault/defect. Moreover, in some examples, the values of 'N' may be omitted.

The DDM 300 also includes a one row sum matrix 324 that stores integer values characterizing a number of test patterns p1 . . . p4 that are employable to detect a particular static fault/defect. For instance, in a box 328, a value of 2 is stored at column 5 of the one row sum matrix 324 of the DDM 300. This value indicates that two different two-cycle delay tests (namely p1 and p2) are employable to detect the candidate fault/defect modeled in column 5. As noted, the defect analyzer generates a fault rules file that corresponds to the DDM 300. The fault rules file provides similar information as the DDM 300 in a format consumable by an IC test engine, such as the IC test engine 150 of FIG. 1.

FIG. 3B illustrates an example of a DDM 350 that could represent the cell (an AND gate) in the given example that includes three cycle test patterns. In the DDM 300, a first box 354 identifies and characterizes two three-cycle test patterns, labeled p1 and p2. For instance, in the given example, the two-cycle delay test pattern p1 is labeled as (In) 00:01:11, (Out) 001 and (ND) "ND". This labeling indicates that in a second test pattern, a logical 0 is applied to node A and to node B, and that an expected response at the output node, Y is a logical 0. This labeling also indicates that in a second test pattern, a logical 0 is applied to node A, and a logical 1 is applied to node B, and that an expected response at the output node, Y is a logical 0. Additionally, this labeling further indicates that in a third test pattern, a logical 1 is applied to node A and to node B, and that the expected response at the output node, Y is a logical 1. Furthermore, the labeling "ND" of p1 represents a recorded nominal delay, Delaynom for the test pattern, p1 (e.g., the transition delay for a defect-free version of the cell). Values at "ND" are stored as integer or fixed point/floating point values. Moreover, in some examples, the nominal delay, Delaynom can be omitted.

Additionally, the DDM 350 includes a 41 by 2 results matrix 358 wherein each of the 41 columns represents a recorded result of a corresponding three-cycle test pattern for a particular candidate fault/defect. That is, each column represents a response to two three-cycle test patterns, p1 and p2 by a particular version of the cell where one fault/defect is modeled. Values in the results matrix 358 of the DDM 350 recorded as a 0 indicate that the particular fault/defect did not have a detectable change on the operation of a cell for a corresponding test pattern. For instance, the value stored in the results matrix 358 at column 4, row 2 indicates that the three-cycle test pattern p2 (00:10:11; 001; "ND") in the first box 304 has a value of 0. This indicates that the three-cycle test pattern, p2 is not employable to detect the particular candidate fault/defect modeled in column 4.

Additionally, values in the results matrix 358 of the DDM 350 recorded as a 1 indicate that the particular fault/defect is a static fault/defect detected by the corresponding test pattern. For instance, the value stored at column 3, row 1 indicates that the three-cycle test pattern p1 (00:01:11; 001; "ND") has a value of 1. This indicates that the three-cycle test pattern, p1 is employable to detect a static fault/defect for the particular candidate fault/defect model in column 3.

Further, a recorded value of 'N' represents a percent deviation or a time deviation (e.g., in µs, ns or ps) from a corresponding nominal delay 'ND' caused by applying a corresponding test pattern for a particular candidate fault/defect. Moreover, in some examples, the values of 'N' may be omitted.

The DDM 350 also includes a one row sum matrix 362 that stores integer values characterizing a number of test patterns p1 and p2 that are employable to detect a particular static fault/defect. For instance, in a box 366, a value of 2 is stored at column 5 of the one row sum matrix 362 of the DDM 350. This value indicates that two different three-cycle tests (namely p1 and p2) are employable to detect the candidate fault/defect modeled in column 5. As noted, the defect analyzer generates a fault rules file that corresponds to the DDM 350. The fault rules file provides similar information as the DDM 350 in a format consumable by an IC test engine, such as the IC test engine 150 of FIG. 1.

Referring back to FIG. 1, the fault rules files 158 for each of the K number of cell types 134 of the cells 132 included in the IC design 108 are provided to the IC test engine 150 for the generation of test patterns for the fabricated IC chip 104 using ATPG techniques. The test patterns generated by the IC test engine 150 include both boundary model test patterns (e.g., non cell-aware test patterns) and cell-aware test patterns. Some test patterns are considered "cell-aware" because the cell-aware test patterns are generated based on candidate faults/defects within boundaries of the cells 132 of the IC design 108. That is, rather than the boundary model test patterns that treat each cell as a "black box", the cell-aware test patterns that are generated by the IC test engine 150 are tailored for specific candidate faults/defects that are possible based on the internal circuit design of cells.

As used herein, defects and/or faults that are characterized as "single cycle" refer to defects and faults, respectively in the fabricated IC chip 104 and the IC design 108 that are detectable with a single cycle test pattern. Additionally, defects or faults that are characterized as "multicycle" refer to defects and faults, respectively in the fabricated IC chip 104 and the IC design 108 that require a value transition (or multiple value transitions). Still further, as noted above, "two-cycle" defects are multicycle defects that are detectable with a two-cycle delay test pattern. Through sim-shifting, two-cycle delay test patterns generated by the IC test engine 150 to detect a particular set of faults/defects are also employable to detect multicycle defects that conventionally require three or more cycles within a capture window, such as faults/defects related to a missing contact of a transistor. These other multicycle defects can be cell-aware defects, such as static faults/defects (e.g., multicycle cell-aware static defects) and/or delay faults/defects (e.g., multicycle cell-aware delay defects).

More particularly, the two-cycle delay test patterns are sim-shifted such that at least two scan shift cycles prior to a launch cycle in a capture window of a given two-cycle delay test pattern could be employed as fault initialization cycles required to activate the defect and enable the required transition to detect the delay defect during the launch cycle, in which the transition is also referred to as fault excitation. This fault excitation is needed to detect particular multicycle delay faults/defects and the capture cycle enables observation of the transition on a primary output pin or at an observable scan flop. Additionally, the shift cycles prior to the capture window are fault simulated for multicycle defects which require two or more cycles for fault initialization.

A two-cycle delay test pattern has one or more scan shift cycles when shift enable is asserted (shift window), followed by a launch cycle and a capture cycle where shift enable is de-asserted (capture window). More generally, a multicycle test pattern includes one or more shift cycles (shift window) and N capture cycles (capture window), where N is an integer greater than or equal to two. Moreover, a cycle (e.g., cycle N−1) during the capture window in a multicycle test pattern is the fault excitation cycle which creates the transition on a cell pin (e.g., alternatively referred to as a cell node) needed to detect a fault or defect and another cycle (e.g., cycle N) captures the transition on a primary output pin or on an observable scan flop (or multiple observable scan flops). Additionally, the remaining cycles of the capture window, namely cycle 1 to cycle N−2, are fault initialization cycles which facilitate the needed conditions for the fault or defect to be detected. More specifically, the cycle N−1 is also referred to as a launch cycle that creates the transition on the node of a cell needed to detect a fault or defect. Furthermore, the cycle N is also referred to as a capture cycle which captures (or observes) the fault or defect on a primary output pin or observable scan flop(s). As one example, in a two-cycle delay test pattern (such that N is equal to 2), the capture cycle is cycle 2 (cycle N), and the launch cycle is cycle 1 (cycle N−1). In such an example, the fault initialization occurs on the last shift cycle. As another example, in a three-cycle test pattern (such that N is equal to 3), the capture cycle is cycle 3 (cycle N), the launch cycle is cycle 2 (cycle N−1), and cycle 1 is the fault initialization cycle. In still another example, in a ten cycle test pattern (such that N is equal to 10), the capture cycle is cycle 10 (cycle N), the launch cycle is cycle 9 (cycle N−1) and cycles 1-8 (cycles N−(N−1) to N−2) are fault initialization cycles. Furthermore, in some examples, cycles other than N−1 and N in the capture window are the launch cycle and the capture cycle. In such cases, cycles prior to launch cycles in the capture window are the fault/defect initialization cycles and cycles after the capture cycle in the capture window are fault/defect propagation cycles.

In some examples, the IC engine 150 can generate a first set of the test patterns that are targeting a specific set of boundary model delay fault/defects in the fabricated IC chips. A scan chain is formed of scan flops that are included in the IC design 108 to propagate test patterns through the IC design 108. Moreover, some such delay faults/defects require multiple cycles of data to propagate a value to a cell 132 that contains potential faults/defects. The IC test engine 150 includes a fault simulator 190 that is activated and deactivated during processing of a test pattern. The fault simulator 190, if activated, verifies that particular values of the test pattern are loaded into the cells 132 in a manner that allows a candidate fault/defect to be detected. Activation of the fault simulator 190 is relatively computationally expensive, such that the IC test engine 150 is configured to disable the fault simulator 190 in times when grading test pattern effectiveness at detecting faults is not needed.

A two-cycle delay test pattern (a particular type of multicycle test pattern) has one or more scan shift cycles to load one or more scan chains with desired values during shift windows, namely a scan-in window and a scan out window. During the scan-in window, a clock operates at a test clock frequency. The scan-in window is followed by a capture window operating at a functional clock frequency that operates at a frequency of about one order of magnitude or more than the test clock frequency. The capture window includes a launch cycle (alternatively referred as a clock pulse) to cause fault excitation and a capture cycle to capture a fault/defect effect into the observable scan flops. The scan out window follows the capture window operating at the test clock frequency to shift the captured values through the scan chains to scan outputs. The value loaded by the launch cycle provides the conditions needed to excite the fault/defect to be tested. Accordingly, the IC design 108 is put in functional mode during the capture window and the capture cycle observes the fault effect at an observable scan flop.

More generally, a multicycle test pattern has one or more scan shift cycles to load one or more scan chains with desired values during the shift window, followed by two or more cycles during the capture window to observe the fault effect at observable scan flops and then shifting out the captured values through the scan chains to scan outputs. In a multicycle test pattern, the values loaded by the last scan shift prior to the launch cycle into the scan flops provide the needed fault initialization values while the first capture clock cycle in the capture window (the launch cycle) creates a transition on the cell input. The second cycle in the capture window (the capture cycle) observes the fault effect into the observable scan flop. There are some dynamic/delay boundary model and cell-aware faults/defects which require more than one initialization cycle. Such faults/defects can either be detected using multicycle ATPG patterns with three or more cycles in the capture window or using the sim-shifting, as described herein. The clock cycles in the capture window are typically provided at the functional speed, and the clock cycles of the shift windows (the scan-in shift window and the scan-out shift window) are provided at the test clock frequency.

As noted, each test pattern in the first set of test patterns is generated to test for a specific set of candidate faults/defects. More particularly, the first set of test patterns are two-cycle delay test patterns that target boundary model delay fault/defects in the fabricated IC chip 104. Moreover, the fault simulator 190 of the IC test engine 150 can be configured to fault simulate the first set of test patterns and employ sim-shifting to determine if any test patterns in the first set of test patterns are employable to detect other faults/defects through serendipitous fault detection. These other faults/defects in the fabricated IC chip can be multicycle cell-aware static defects, two-cycle cell-aware delay faults/defects and/or multicycle cell-aware delay faults/defects.

For instance, presume that a given two-cycle delay test pattern of the first set of test patterns tests for a boundary model delay fault/defect on an output Y of an AND gate (e.g., for a boundary model of the AND gate of the given example). In this situation, the given two-cycle delay test pattern could be input A=0,1 and input B=1,1 for Y=0,1. That is, the launch cycle of the given two-cycle delay test pattern causes a transition at input A of 0 to 1, which would cause a transition at the output Y of 0 to 1. In this example, the fault simulator 190 could fault simulate the given boundary model dynamic two-cycle delay test pattern against cell-aware faults/defects to determine if the given boundary model dynamic two-cycle delay test pattern is employable to detect static cell-aware faults/defects or multiple multicycle-cell aware faults/defects through serendipitous fault detection. Such other multicycle cell-aware faults/defects can be static or delay faults/defects. If any such multicycle cell-aware faults/defects are detectable with the given dynamic boundary model two-cycle delay test pattern, these other multicycle cell-aware faults/defects can be marked off for fault detection by the IC test engine 150. Accordingly, the IC test engine 150 does not need to generate specific test patterns for the multicycle cell-aware faults/defects that are marked off (because of serendipitous fault detection) since the given two-cycle delay test pattern is employable to detect them. Thus, the IC test engine 150 can examine each cell instance 136 to determine which, if any, test patterns and/or candidate faults/defects should be filtered (not generated or removed, respectively) based on the first set of test patterns generated for testing candidate faults/defects of the IC design 108. More particularly, sim-shifting the given two-cycle delay test pattern causes the IC test engine 150 to activate the fault simulator 190 at least one clock cycle prior to a capture window. Therefore, the sim-shifted two-cycle delay test pattern can utilize both the last shift state (also the state at the beginning of the capture window) and the one before that (at the beginning of the last shift cycle) in the shift window as fault/defect initialization cycles, which may be a necessary condition to detect a given dynamic multi-cycle fault/defect at a cell 132 of the IC design 108. As an example of this concept, FIG. 4 illustrates an example of a partition of an IC design 400 that is employable in the IC design 108 for propagating a test pattern.

The IC design 400 includes five scan flops (labeled "flop"), namely, scan flop A 404, scan flop B 408, scan flop C 412, scan flop D 416 and observable scan flop E 420. Scan flop B 408, scan flop C 412 and observable scan flop E 420 are connected to each other in a scan path 432 of a scan chain. Scan flop A 404 and scan flop D 416 are part of other scan chains in the IC design 400. Each scan flop includes a data input port, (labeled D), a scan-input port (labeled SI), a scan-enable port (labeled SE) and a clock input port (labeled CLK). Additionally, each scan flop includes an output port (labeled Q). For purposes of simplification of explanation, some termination points and interconnections are omitted. For instance, in the present example, it is presumed that scan flop A 404, scan flop B 408, scan flop C 412, scan flop D 416 and scan flop E 420 each receive the same scan-enable signal, SE and the same clock signal, CLK.

The output port, Q of flop A 404 is provided to functional logic 424 (represented as a cloud), and the output of the functional logic 424 is provided to the data input, D port of scan flop C 412. The functional logic 424 can represent functional logical operators (e.g., gates, or sequential logical operations) formed by cells that execute function of an IC design. The output port, Q of the scan flop B 408 is provided to the scan-in port, SI of the scan flop C 412. The output port, Q of the scan flop C 412 is provided to a fault site functional logic 428 and to the scan-input port, SI of scan flop E 420. The fault site functional logic 428 (represented as a cloud) also includes functional operators, and also includes a particular cell that is to be tested for a particular candidate fault/defect (e.g., an open wire, such as an open wire potentially causing a missing contact in a transistor) with the scan path 432. The fault site functional logic 428 provides an output signal to the data input port, D of scan flop D 416.

The scan-enable signal, SE provides a multiplexer (MUX) control signal for the scan flop A 404, the scan flop B 408, the scan flop C 412, the scan flop D 416 and the scan flop E 420. In the examples illustrated, it is presumed that the scan-enable signal, SE is an active high signal, but in other examples, the scan-enable signal can be an active low signal. During time intervals (windows) that the scan-enable signal, SE is asserted (e.g., logical 1), scan flop A 404, scan flop B 408, scan flop C 412, scan flop D 416 and scan flop E 420 are configured to pass a value received at the scan-input port, SI to the output port, Q. Conversely, during time intervals (windows) that the scan-enable signal, SE is de-asserted (e.g., logical 0), scan flop A 404, scan flop B 408, scan flop C 412, scan flop D 416 and scan flop E 420 are configured to pass a value received at the data input port, D to the output port, Q.

The scan path 432 is arranged to enable a scan shift path for test data, TEST DATA provided to the scan-input, SI of scan flop B 408. The scan path 432 is arranged such that if the scan-enable signal, SE is asserted (logical 1), the test data, TEST DATA propagates along the scan path 432. Additionally, the scan chain of the IC design 400 is configured such that the value input to the scan-input port, SI of scan flop E 420 is the same value that is applied to the fault site functional logic 428 from scan flop C 412. Accordingly, scan flop C 412 is upstream from the fault site functional logic 428. Furthermore, the IC design 400 is configured such that scan flop D 416 captures the output of the fault site functional logic 428. Therefore, scan flop D 416 is downstream from the fault site functional logic 428. Thus, a value read at the output, Q of scan flop D 416 is evaluated to determine whether the particular candidate fault/defect (e.g., an open wire potentially causing a missing connection in a transistor) is present within the fault site functional logic 428.

In the examples provided, it is presumed that the delay cell-aware defect at a fault site in functional logic 428 requires two initialization cycles to create the correct conditions for its detection by the following at-speed launch and capture cycles for fault/defect excitation followed by observation. It is further presumed that the initialization values required are 1 followed by a 0 and that a 0 to 1 at-speed transition is required to excite the defect during the launch cycle. Continuing with this example, the TEST DATA loaded by the ATPG engine into the scan flop C 412 after the last scan shift is 1 to satisfy the first initialization value requirement. Furthermore, the value 0 loaded into scan flop A 404 after the scan shift has ended is presumed to result in a 0 at output of the functional logic cloud 424, which is also the functional input D of the scan flop C 412. This causes the scan flop C 412 to transition from 1 to 0 on the first at-speed clock cycle in the capture window to satisfy the second initialization value requirement for the defect at the fault site in functional logic 428. It is presumed that the first at-speed clock loads a 1 in flop A which in turn results in a 1 at the D input of flop C 412. The second at-speed clock cycle, launch cycle, causes scan flop C 412 to transition from a logical 0 to a logical 1 at the output, Q. More particularly, the launch cycle on the clock signal, CLK, causes the flop C 412 to excite (with the logical 0 to 1 transition) the fault/defect in the functional logic cloud 428. A subsequent capture cycle enables the flop D 416 to capture the effect of the excitation of the fault through the fault site functional logic 428.

Figure 5:
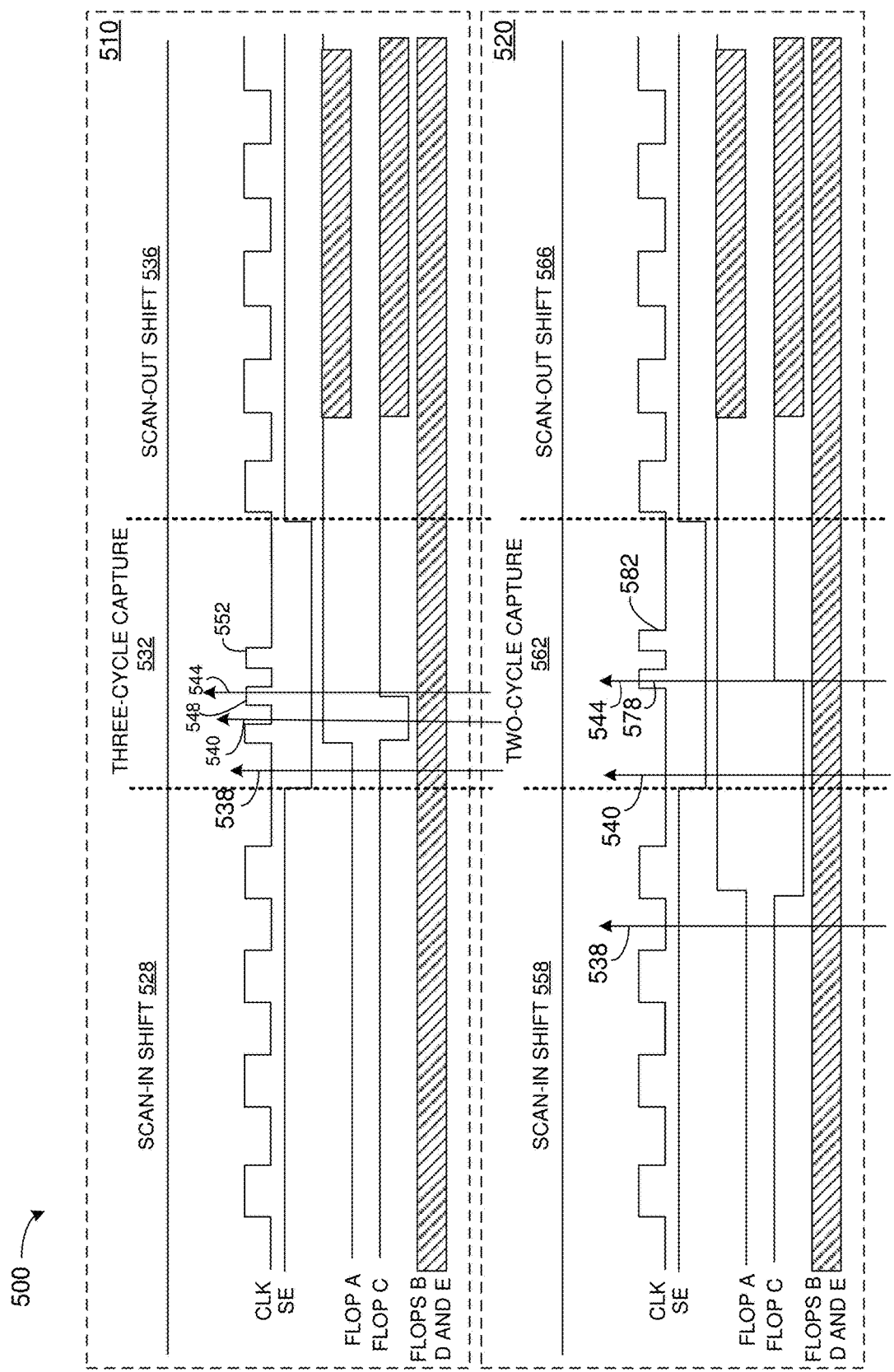
FIG. 5 illustrates a waveform diagram with a first set of waveforms and a second set of waveforms that represent waveforms of signals propagating through the scan chain of FIG. 4.

FIG. 5 illustrates a waveform diagram 500 with a first set of waveforms 510 and a second set of waveforms 520 that represent waveforms of signals propagating through the IC design 400 of FIG. 4. For purposes of illustration, the first set of waveforms 510 and the second set of waveforms are plotted on the same timescale and the same reference numbers are employed in FIGS. 4 and 5 to denote the same structure. Further, it is presumed that a dynamic/delay cell-aware defect site in functional logic 428 requires two initialization cycles with value 1 followed by a 0, and requires a 0 to 1 at-speed transition for fault/defect excitation.

The first set of waveforms 510 includes a scan-in shift window 528, a three-cycle capture window 532 and a scan-out shift window 536. In the first set of waveforms 510, a scan-enable signal, SE is asserted (logical 1) during the scan-in shift window 528 and the scan-out shift window 536. The first set of waveforms 510 represents a three cycle (multicycle) test pattern that causes an output of scan flop C 412 to transition from a logical 0 to a logical 1 during the three-cycle capture window 532 that is generated to detect a candidate fault/defect in an IC chip, such as a missing contact of a transistor. In the example illustrated, the candidate fault/defect is a cell-aware delay fault/defect.

During the scan-in shift window 528 the clock signal, CLK operates at a test frequency, and the scan-enable signal, SE is asserted (logical 1). During the three-cycle capture window 532, the clock signal, CLK operates at a functional frequency. The test frequency is usually at least one order of magnitude slower than the functional frequency of an IC chip that includes the scan path 432. For example, if the functional frequency of the IC chip is 1 gigahertz (GHz), the test frequency of the scan path 432 could be 100 megahertz (MHz) or less. During the scan-in shift window 528, values of test data are loaded into the scan path 432 and propagated through the scan path 432.

During the three-cycle capture window 532, a first fault initialization cycle 538 occurs in response to the last cycle of the clock signal, CLK prior to the three-cycle capture window 532, which is alternatively referred to as a shift clock cycle. At first fault initialization cycle 538, the scan flop A 404 provides an output, Q of logical 0, and the scan flop C provides an output Q of logical 1. Additionally, a second fault initialization cycle 540, occurs in response to the first cycle of the clock signal, CLK during the three-cycle capture window 532. The scan-in input, SI of scan flop A 404 (labeled "FLOP A" in FIG. 5) is loaded such that the output, Q of observable scan flop A 404 transitions to a logical 1 in response to the first cycle of the clock signal, CLK during the three-cycle capture window 532 for the second fault initialization cycle 540. Additionally, in response to the first cycle of the clock signal, CLK during the three-cycle capture window 532, the output Q of observable scan flop C (labeled "FLOP C" in FIG. 5) transitions to a logical 0.

In the first set of waveforms 510, at the start of the three-cycle capture window 532, the scan-enable signal, SE is de-asserted (e.g., logical 0), and the clock signal, CLK is inhibited from pulsing at regular intervals. Additionally, at the start of the three-cycle capture window 532, a fault simulator of the IC test engine (e.g., the fault simulator 190 of FIG. 1) is activated. In response to activation, the fault simulator verifies that a logical 1 is input to the fault site functional logic 428. Accordingly, the fault simulator is activated to verify if correct values are available for the first fault initialization cycle 538 and the second fault initialization cycle 540.

More particularly, the first set of waveforms 510 elicits the three-cycle capture window 532 which includes a launch cycle 548, which is implemented as a second clock cycle of the clock signal, CLK and a capture cycle 552, which is implemented as a third clock cycle of the clock signal, CLK (a capture cycle). During the three-cycle capture window 532, the clock signal, CLK operates at the functional frequency of the IC design. Accordingly, the launch cycle 548 and the capture cycle 552 have a frequency that corresponds to the functional frequency for the IC design. Additionally, in response to the launch cycle 548, the scan flop C 412 transitions from a logical 0 to a logical 1. Hence, the launch cycle 548 results in the fault excitation 544.

Additionally, in response to the capture cycle 552, the scan flop D 416 captures the output of the fault site functional logic 428 to determine the effect (if any) on the candidate fault/defect if the fault/defect is present in the IC design. More particularly, as an example, if the output of the fault site functional logic 428 transitions from 0 to 1 due to the scan flop C 412 transitioning from 0 to 1, then the candidate fault/defect may be observed by the scan flop D 416. A defect free circuit would observe the correct final value 1 from the 0 to 1 transition since this transition would reach the observe scan flop D 416 within the functional clock period. If a defect in the functional logic 428 in real silicon results in this 0 to 1 transition reaching the observe scan flop D 428 later than the functional clock period, then a 0 would be observed instead of the expected value 1.

Further, during execution of the test pattern on a fabricated IC chip (e.g., the fabricated IC chip 104 of FIG. 1) using an ATE (e.g., the ATE 198 of FIG. 1), if the value at the output, Q of the scan flop D 416 is an expected result, this expected result indicates that the candidate fault/defect is not present in the fabricated IC chip. Conversely, if the value at the output, Q of the scan flop D 416 is an unexpected result, this unexpected result indicates that the candidate fault/defect is possibly present in the fabricated IC chip, such that the fabricated IC chip may not function correctly.

At the end of the three-cycle capture window 532, the scan-enable signal, SE is re-asserted (logical 1), and the fault simulator is disabled, transitioning to the scan-out shift window 536. Additionally, during the scan-out shift window 536, the clock signal, CLK returns to providing cycles at the test frequency.

The second set of waveforms 520 represents a two-cycle delay test pattern with sim-shifting applied such that the sim-shifted two-cycle delay test pattern mimics the operation of the three-cycle test pattern (a multicycle test pattern) illustrated by the first set of waveforms 510. Accordingly, in the examples provided, it is presumed that either a fault simulator (e.g., the fault simulator 190 of FIG. 1) fault simulated the existing two-cycle delay test pattern and determined that sim-shifting the two-cycle delay test pattern enables the two-cycle delay test pattern to detect the same candidate fault/defect (e.g., a multicycle cell-aware delay fault/defect) that is detectable with the three-cycle test pattern characterized by the first set of waveforms 510 or a new two-cycle delay test pattern is generated utilizing sim-shifting to create the additional initialization cycles required for the same candidate fault/detect during the shift clock cycles.

The second set of waveforms 520 includes a scan-in shift window 558, a two-cycle capture window 562 and a scan-out shift window 566. In the second set of waveforms 520, a scan-enable signal, SE is asserted (logical 1) during the scan-in shift window 558 and the scan-out shift window 566. The set of waveforms 510 represents a two-cycle (multicycle) test pattern that causes an output of scan flop C 412 to transition from a logical 0 to a logical 1 during the two-cycle capture window 562 that is generated to detect a candidate fault/defect in an IC chip. In the example illustrated, the candidate fault/defect is a two-cycle cell-aware delay fault/defect. The second set of waveforms 520 shows how the fault simulator utilizes sim-shifting to determine if the intended two-cycle delay test pattern targeting a delay fault/defect, which traditionally requires one fault initialization cycle, could also potentially detect multicycle delay faults/defects requiring two or more initialization cycles.

During the scan-in shift window 558 the clock signal, CLK operates at the test frequency and the scan-enable signal, SE is asserted (logical 1). During the two-cycle capture window 562, the clock signal, CLK operates at the functional frequency. During the scan-in shift window 528, values of test data are loaded into the scan path 432 and propagated through the scan path 432.

For the second set of waveforms 520, during the scan-in shift window 558, the first fault initialization cycle 538 occurs in response to a cycle of the clock signal two cycles prior to the two-cycle capture window. In the second set of waveforms 520, at the start of the three-cycle capture window 532, the scan-enable signal, SE is de-asserted (e.g., logical 0), and the clock signal, CLK is inhibited from pulsing at regular intervals. Additionally, the second fault initialization cycle 540 occurs in response to the last cycle of the clock signal prior to the two-cycle capture window 562. At the second fault initialization cycle 540, the scan-in input, SI of scan flop A 404 (labeled "FLOP A" in FIG. 5) is loaded such that the output, Q of observable scan flop A 404 transitions to a logical 1 in response to a cycle of the clock signal, CLK prior to the two-cycle capture window 562. Additionally, in response to the cycle of the clock signal, CLK prior to the two-cycle capture window 562, the output Q of observable scan flop C 412 (labeled "FLOP C" in FIG. 5) transitions to a logical 0.

Additionally, in the second set of waveforms 520, in response to the first fault initialization cycle 538, the IC test engine activates the fault simulator, such that the window observed by the fault simulator moves relative to the test pattern characterized by the first set of waveforms 510. Accordingly, in the second set of waveforms 520, the fault simulator is activated during the scan-in shift window 558, while the scan-enable signal, SE is asserted (e.g., logical 1). In response to activation, the fault simulator verifies that the first fault initialization value (namely logic 1) is received by the fault site functional logic 428.

As compared to the first set of waveforms 510, in the second set of waveforms 520, the first fault initialization cycle 538 occurs during the scan-in shift window 558. More specifically, the first fault initialization 538 occurs in response to the cycle during the scan-in shift window 558 for the second set of waveforms 520 and before the start of the two-cycle capture window 562. The second fault initialization 540 also occurs in response to the cycle during the scan-in shift window 558 but this value is held in the scan flops during the beginning of the capture window 562, hence the marker 540 is shown in the capture window. The second set of waveforms 520 also elicits the two-cycle capture window 562 which includes a launch cycle 578, which is implemented as a first clock cycle of the clock signal, CLK and a capture cycle 582, which is implemented as a second clock cycle of the clock signal, CLK (a capture cycle). During the two-cycle capture window 562, the clock signal, CLK operates at the functional frequency of the IC design. Accordingly, the launch cycle 578 and the capture cycle 582 can have a frequency that corresponds to the functional frequency for the IC design. Additionally, as illustrated, in response to the launch cycle 578, the scan flop C 412 transitions from a logical 0 to a logical 1. Hence, the launch cycle 548 results in the fault excitation 544.

Additionally, in response to the capture cycle 552, the scan flop D 416 captures the output of the fault site functional logic 428 to determine the effect (if any) on the candidate fault/defect if the fault/defect is present in the IC design. This operation, namely the reading of the output, Q of scan flop D 416 in response to the capture cycle 552, corresponds to reading the output, Q of scan flop D 416 in response to the capture cycle 552 in the first set of waveforms 510. Additionally, during execution of the test pattern on a fabricated IC chip (e.g., the fabricated IC chip 104 of FIG. 1) using an ATE (e.g., the ATE 198 of FIG. 1), if the value at the output, Q of scan flop D 416 is an expected result, this indicates that the candidate fault/defect is not present in the IC chip. Conversely, if the value at the output, Q of scan flop D 416 is an unexpected result, this unexpected result indicates that the candidate fault/defect is possibly present in the fabricated IC chip, and the fabricated IC chip may not function correctly.

At the end of the two-cycle capture window 562, the scan-enable signal, SE is re-asserted (logical 1), and the fault simulator is disabled, transitioning to the scan-out shift window 566. Additionally, during the scan-out shift window 566, the clock signal, CLK returns to providing cycles at the test frequency. As compared to the first set of waveforms 510, in the second set of waveforms 520, the first fault initialization cycle 538 occurs during the scan-in shift window 558. More specifically, the first fault initialization cycle 538 occurs in response to the cycle during the scan-in shift window 558 for the second set of waveforms 520 and before the start of the two-cycle capture window 562. Accordingly, by leveraging operations in the scan-in shift window 558 as fault initialization for a multicycle test pattern, multicycle delay faults/defects requiring two or more initialization cycles and hence, three or more cycles in the capture window (e.g., the three-cycle capture window 532) are detectable with a two-cycle test pattern.

Moreover, in examples where a fault/defect requires four or more clock cycles (N cycles) for detection by virtue of a two or more initialization cycle requirement, each of the clock cycles from 1 to cycle N−2 (fault initialization) can be executed during the scan-in shift window 558. In these situations, the fault simulator is activated during N−2 shift cycles prior to the capture cycle (e.g., the capture cycle 582). The first fault initialization occurs prior to the N−2 shift cycles from the capture cycle 582, and the second fault initialization occurs N−1 shift cycles prior the capture cycle 582. For example, for a multicycle delay fault/defect requiring 4 clock cycles, the fault simulator is activated in response to a second to last shift cycle of the scan-in shift window 558. The values at the end of the second to last shift cycle of the scan-in shift window 558 provide the first fault initialization state. This value is also the same at the beginning of the last shift cycle. Hence, the fault simulator can also be activated at the beginning of the last shift cycle in this case. The values after the last shift cycle, held at the beginning of the capture window 562, provide the second fault initialization state.

Referring back to FIG. 1, the first set of test patterns, which are implemented as two-cycle boundary model test patterns or as cell-aware delay test patterns are employable to detect multicycle cell-aware faults/defects by employing sim-shifting, including cell-aware faults/defects (static or delay faults/defects) with sim-shifting. Stated differently, the first set of test patterns are fault simulated such that the state of the IC design 108 after at least the last two shift clock cycles of the scan-in shift window of each of the respective two-cycle delay test pattern of the first test patterns are fault simulated to provide two fault initialization cycles for detection of a multicycle delay fault and/or defect. Accordingly, the IC test engine 150 can examine each cell instance 136 to determine which, if any, test patterns and/or candidate faults/defects should be filtered (not generated or removed, respectively) based on sim-shifted test patterns generated for testing candidate faults/defects of the IC design 108.

As an example of sim-shifting a two-cycle delay test pattern of the first set of test patterns to test for a multicycle fault/defect, consider the DDM 300 of FIG. 3A in the given example. In the given example, the test pattern, p1: 01:11, (Out) 01 is employable to detect static cell-aware faults/defects for candidate faults/defects (each represented as one of the 41 columns) with a value of 1. Additionally, the test pattern, p1: 01:11, (Out) 01 is also employable to detect cell-aware delay defects with a value of 'N' (which corresponds to a numeric value). Thus, in a situation where a two-cycle test pattern causes test pattern p1 to be executed on an instance of this cell, this two-cycle test pattern enables the testing for the candidate static fault/defect characterized in column 1, row 1 of the DDM 300. Additionally, the two-cycle delay test pattern also enables detection of other static multicycle faults/defects with a value of 1 in the DDM 300, such as the static candidate faults/defects corresponding to columns 3, 5, 7-11, 13, 19, 21, 23, 33, 35 and 38. Moreover, this two-cycle delay test pattern enables detection of delay cell-aware faults/defects corresponding to columns 22 and 36 as represented by columns with value N in the DDM 300.

Moreover, the sim-shifting of the two-cycle delay test patterns further enables detection of other multicycle faults/defects that conventionally require three or more cycles in the capture window. Consider the given example where the test pattern, p1: 01:11, (Out) 01 is generated. In the given example, with sim-shifting the two-cycle test pattern, p1: 01:11, (Out) 01 in the DDM 300 may be employable to detect delay cell-aware defects (each represented as one of the 41 columns) of the DDM 350 that have a value of N. For example, through sim-shifting, a value of node A and a value of node B prior to execution of the test pattern p1 of the DDM 300 is evaluated. If the value of node A and the value of node B are both 0 prior to application of the two-cycle test pattern p1 in the DDM 300 in FIG. 3A, the fault simulator 190 of FIG. 1 can determine that the three-cycle test pattern (a multicycle test pattern) of p1 in the DDM 350 in FIG. 3B has also been applied. Accordingly, if the test pattern p1 of the DDM 350 is applied, detection of other delay cell-aware multicycle faults/defects with a value of N in the DDM 350, but not in DDM 300, are detectable, such as the delay cell-aware candidate faults/defects corresponding to column 15. In such a situation, the IC test engine 150 of FIG. 1 can mark off these other multicycle delay cell-aware faults/defects. Accordingly, the test patterns for the other multicycle delay cell-aware faults/defects can be filtered (removed or not generated) for testing to avoid redundant testing.

Additionally, the IC test engine 150 can examine the untested faults/defects in the IC design 108 and generate a second set of test patterns, which can be referred to as top-off two-cycle cell-aware test patterns. The second set of test patterns could be two-cycle delay cell-aware test patterns that target both two-cycle and multi-cycle delay cell-aware faults/defects in the IC design 108. The ATPG pattern generator of the IC test engine 150 could either employ the fault simulator 190 with sim-shifting during pattern generation process and/or the IC test engine 150 could employ the fault simulator 190 to fault simulate a two-cycle delay cell-aware test pattern in the second set of test patterns against other two-cycle and multicycle cell-aware delay faults/defects with serendipitous fault detection. These other two-cycle and multicycle delay faults/defects can then be marked off. Accordingly, test patterns for the other multicycle cell-aware faults/defects can be filtered (removed or not generated) for testing to avoid redundant testing.

Additionally, the IC test engine 150 can again examine the untested faults/defects in the IC design and generate a third set of test patterns, which can be referred to as top-off multicycle cell-aware test patterns. The top-off multicycle cell aware test patterns target multicycle cell-aware delay faults/defects that are not yet marked off.

In other examples, the IC test engine 150 can generate two-cycle cell-aware delay test patterns as the first set of test patterns. In such examples, the first set of test patterns are two-cycle cell-aware test patterns that target particular delay two-cycle cell-aware faults/defects in the IC design 108.

Further, continuing with these examples (the first set of test patterns are two-cycle cell-aware delay test patterns), the fault simulator 190 can apply sim-shifting to each test pattern in the first set of test patterns to fault simulate each such test pattern against other multicycle cell-aware delay faults/defects (e.g., in a manner described with respect to FIG. 5). Accordingly, in situations where sim-shifting two-cycle delay test patterns of the first set of test patterns enable the detection of multicycle cell-aware static or delay faults/defects, these detectable faults/defects can be marked off. Therefore, test patterns for the other multicycle cell-aware faults/defects can be filtered (removed or not generated) for testing to avoid redundant testing.

Additionally, continuing with these examples (the first set of test patterns are two-cycle cell-aware delay test patterns), the IC test engine 150 can examine the untested faults/defects in the IC design 108 and generate a second set of test patterns, which can be referred to as top-off two-cycle cell-aware test patterns. The second set of test patterns could be two-cycle delay cell-aware test patterns that target both two-cycle and multi-cycle delay cell-aware faults/defects not already marked off (untested) in the IC design 108. The ATPG pattern generator of the IC test engine 150 could either employ the fault simulator 190 with sim-shifting during pattern generation process and/or the IC test engine 150 could employ the fault simulator 190 to fault simulate a two-cycle delay cell-aware test pattern in the second set of test patterns against other two-cycle and multicycle cell-aware delay faults/defects with serendipitous fault detection. These other two-cycle and multicycle delay faults/defects can then be marked off in the active fault population. Accordingly, test patterns for the other multicycle cell-aware faults/defects can be filtered (removed or not generated) for testing to avoid redundant testing.

Still further, continuing with these examples (the first set of test patterns are two-cycle cell-aware delay test patterns), the IC test engine 150 can again examine the untested faults/defects in the IC design and generate a third set of test patterns, which can be referred to as top-off multicycle cell-aware test patterns. The top-off multicycle cell aware test patterns target multicycle cell-aware delay faults/defects that are not yet marked off.

In any such example, after selecting the first set of test patterns, the second set of test patterns and the third set of test patterns, the IC test engine 150 can provide test patterns 196 that can be a combination of the first set of test patterns, the second set of test patterns and the third set of test patterns that are employable for testing the fabricated IC chip 104. The IC test engine 150 can output the test patterns 196, which include one or more sim-shifted test patterns. The test patterns 196 are employable by an ATE 198 to test the fabricated IC chip 104. In some examples, the test patterns 196 are stored in memory 116 and/or the ATE 198 prior to execution of the testing. The ATE 198 can alternatively be referred to as an IC chip tester or an IC chip tester machine. The ATE 198 can be implemented as a hardware device that is electrically coupled to pins on the fabricated IC chip 104. In the examples illustrated, such pins can be coupled to the interface 140 of the fabricated IC chip 104.

The test patterns 196 employed by the ATE 198 contain stimuli to be applied to inputs and the expected values on the outputs of the fabricated IC chip 104. The ATE 198 is configured such that if the measured value by the ATE 198 is different from the expected value specified in the test patterns 196, the ATE 198 stores the failure data. The failure data can be sent to the IC test engine 150 later to determine the cause of one or more failures in the fabricated IC chip 104. In situations where application of the test patterns 196 indicates that the fabricated IC chip 104 is operating properly (e.g., within acceptable tolerances), the fabricated IC chip 104 can be approved for deployment. In situations where the application of the test patterns 196 indicate that the fabricated IC chip 104 is not operating properly (e.g., within tolerances), the fabricated IC chip 104 can be rejected, such that the fabricated IC chip is not deployed.

The IC design 108 has a variety of cell types 134 based on the architecture of the IC design 108 and the specific operation environment in which the fabricated IC chip 104 is designed to operate. The test patterns 196 generated by the IC test engine 150 are tuned based on the fault rules files 158, wherein some of the test patterns generated are executed as sim-shifted two-cycle delay test patterns that are employable to test both two-cycle delay faults/defects and multicycle faults/defects, including multicycle cell-aware faults/defects (static or delay faults/defects). The fault rules files 158 are unique for each cell type 134 and describe the defect initialization and excitation values on the input pins and expected output pin values of the given cell type 134. By employing the ATPG techniques to provide sim-shifting of some test patterns within the test patterns 196, the quality and quantity of test patterns 196 is improved (relative to conventional ATPG techniques). Accordingly, the number of detectable faults/defects in the fabricated IC chip 104 is improved, such that the overall accuracy of the testing executed by the ATE 198 is improved as well.

Figure 6:
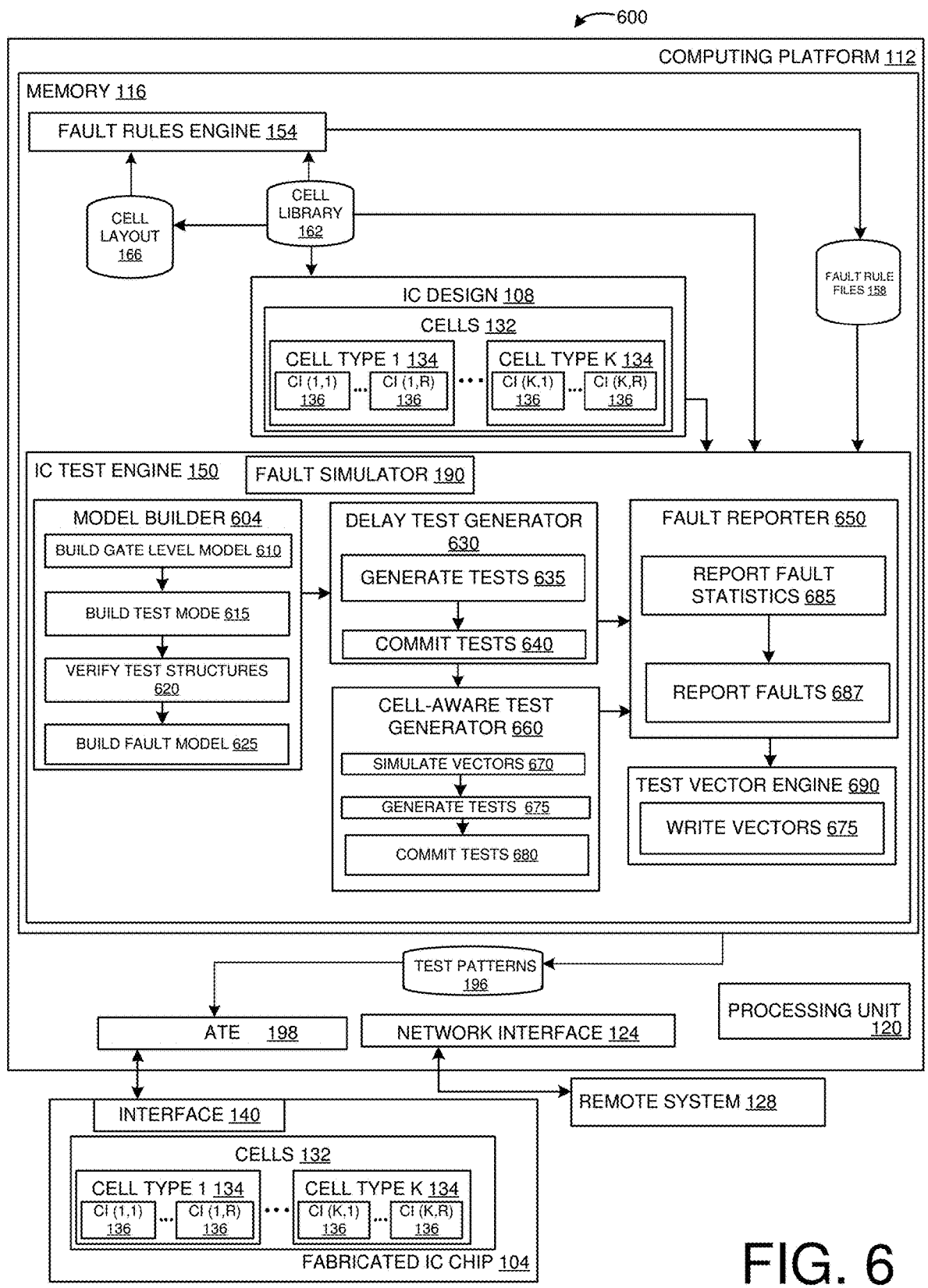
FIG. 6 illustrates another example of a system for testing a fabricated IC chip that is based on an IC design.

FIG. 6 illustrates a system 600 for testing the fabricated IC chip 104. The system 600 is similar to the system 100 of FIG. 1 with a detailed view and description of the IC test engine 150. Thus, for purposes of simplification of explanation, the same reference numbers are employed in FIGS. 1 and 6 to denote the same structure. Additionally, some reference numbers are not re-introduced. The IC design 108 can be stored in the memory 116 of the computing platform 112. The IC design 108 can be implemented, for example, as design specifications for an IC chip. The fabricated IC chip 104 represents a physical instantiation of the IC design 108, and the interface 140 can provide an interface for external systems to provide stimuli to the components of the fabricated IC chip, including the cells 132 of the fabricated IC chip 104.

The IC test engine 150 stored in the memory 116 is configured to employ ATPG techniques to generate the test patterns 196 that include two-cycle delay test patterns targeting two-cycle delay faults/defects and other multicycle faults/defects (static and/or delay defects) in the fabricated IC chip 104 to ensure proper operation. More specifically, the test patterns 196 include at least one two-cycle delay test pattern that is generated to test for a two-cycle delay fault/defect (a boundary model fault/defect or a cell-aware defect) in the fabricated IC chip 104, but is also employed (through sim-shifting of the two-cycle delay test pattern) to test for other multicycle delay fault/defect (or multiple multicycle delay faults/defects), including a multicycle delay fault/defect that conventionally requires a capture window with at least three cycles. More particularly, the IC test engine 150 generates the test patterns 196 that are employable by the ATE 198 to test the fabricated IC chip 104. The ATE 198 is configured such that if the measured value by the ATE 198 is different from the expected value specified in the test patterns 196, the ATE 198 stores the failure data. The failure data can be sent to the IC test engine 150 later to determine the cause of one or more failures in the fabricated IC chip 104.

The IC test engine 150 can also operate in concert with the fault rules engine 154 stored in memory 116. The fault rules engine 154 can be configured/programmed to generate fault rules files 158. In some examples, the fault rules engine 154 generates DDMs that each represent a user-readable format of a corresponding fault rules file 158. Each fault rules file 158 represents a set of fault rules for a particular cell type 134 that corresponds to a cell that is selected from a cell library 162. The cell library 162 can include, but is not limited to, data characterizing a physical layout of each of the K number of cell types 134 in the cells 132 of the IC design 108 and the fabricated IC chip 104. The cell library 162 can also include structural Verilog (.v), behavioral Verilog (.v) and timing models (.lib).

To generate the fault rules files 158, the fault rules engine 154 can read a cell layout 166 from the cell library 162. The cell layout 166 can characterize a physical layout for a particular cell type 134 extracted from the cell library 162. The fault rules engine 154 generates a particular fault rules file 158 of the fault rules files 158 based on the cell identified in the cell layout 166. Each fault rules file 158 can provide information similar to the information included in the DDM 300 described with respect to the given example.

The fault rules files 158 for each of the K number of cell types 134 of the cells 132 included in the IC design 108 are provided to the IC test engine 150 for the generation of cell-aware test patterns, including single cycle and multi-cycle test patterns for the fabricated IC chip 104 using ATPG techniques. Moreover, the IC test engine 150 can generate both cell-aware and non-cell aware test patterns (e.g., boundary model delay test patterns).

The IC test engine 150 can represent a plurality of software modules operating in an ordered sequence to generate the test patterns 196 using ATPG techniques. The test patterns include a set of two-cycle delay test patterns that are each generated for detecting a particular two-cycle delay fault/defect. Additionally, at least one such two-cycle delay test pattern is employed to detect another multicycle fault/defect (or multiple multicycle faults/defects) through sim-shifting. The IC test engine 150 includes a model builder 604 that can build a model of the IC design 108 that is employable to generate test patterns to test the fabricated IC chip 104. To build the model of the IC design 108, the model builder 604 can execute model builder operations. More particularly, at 610, the model builder 604 builds a gate model of the IC design 108. At 615, the model builder 604 builds a test mode. The build test mode reads test pin specifications and creates a test mode view given these test pin specifications. Such test pin specifications, among other things, can include scan-input pin names, scan-output pin names, test clock pin names, set/reset pin names and other constraints necessary to put the design in a test mode.

At 620, the model builder 604 verifies the presence of test structures in the gate level model of the IC design 108. The test structures represent scan and test circuitry present in the IC design 108 to facilitate the application of cell-aware test patterns to the fabricated IC chip 104. The operations at 620 also check if the IC design 108 complies with test design rules given the test constraints/specifications read in 615. For example, the operations at 620 can verify that the flops in the IC design 108 can be controlled by specified test clocks, and can verify that these test clocks can be controlled properly through primary input pins. Additionally, the operations at 620 can verify that set/reset to flops be controlled through primary input pins or if the flops are in an off state.

At 625, the model builder 604 can employ the gate level design to build a fault model for the IC design 108. In some examples, the fault model can include candidate boundary fault/defects, including static and delay faults/defects. Additionally, the model builder 604 can employ the fault rules files 158 and the gate level design (generated by the model builder 604) to build a cell-aware fault model for the IC design 108. The cell-aware fault model includes candidate faults/defects represented as shorts or opens identified by the fault rules engine 154.

The fault model includes candidate faults/defects represented as stuck-at 1 or 0, as well as delay faults/defects, such as slow to rise or slow to fall faults/defects. The boundary fault model built by the model builder 604 can be provided to a delay test generator 630 of the IC test engine 150.

The delay test generator 630 can execute test generation operations for delay test patterns, including multicycle test patterns. More particularly, at 635, the delay test generator 630 can employ ATPG techniques to generate two-cycle boundary model delay test patterns for the fabricated IC chip 104 based on the fault model generated by the model builder 604. More specifically, the IC test engine 150 can generate a set of test patterns tailored for each of the R number of cell instances 136 of each of the K number of cell types 134 of the cells 132 in the IC design 108. The two-cycle delay test patterns are generated to target candidate faults/defects at a boundary of cells 132 of the IC design 108, such as two-cycle boundary model delay faults/defects.

At 640 the delay test generator 630 commits the test patterns generated at 635 to test the fabricated IC chip 104. The test patterns generated by the delay test generator 630 can be provided to a fault reporter 650 and to a cell-aware test generator 660.

At 670, the cell-aware test generator 660 employs the fault simulator 190 to fault simulate the two-cycle boundary model test patterns generated by the delay test generator 630 against other multicycle cell-aware defects. More particularly, as explained with respect to FIG. 5, through sim-shifting, a two-cycle delay test pattern is employable to detect a multicycle fault/defect (such as static and/or delay faults/defects) that would conventionally require at least three cycles in a capture window. Moreover, at 670, the multicycle cell-aware faults/defects that are detectable with the two-cycle boundary model test patterns are marked off by simulated vectors.

At 675, the cell-aware test generator 660 can execute test generation operations. More particularly, at 675, the cell-aware test generator 660 can employ ATPG techniques to generate multicycle cell-aware delay test patterns for the fabricated IC chip 104 based on the cell-aware fault model. More specifically, the IC test engine 150 can examine the fault rules files 158 and the untested faults/defects to generate a set of top-off multicycle test patterns that target multicycle cell-aware faults/defects and that can detect other multicycle faults/defects (static and/or delay faults/defects) with sim-shifting (as explained with respect to FIG. 5). The multicycle cell-aware faults/defects can be marked off by the cell-aware test generator 660. Additionally, at 675, the cell-aware test generator 660 can generate a set of top-off multicycle test patterns that target untested multicycle cell-aware delay faults/defects in the fabricated IC chip 104.

At 680 the cell-aware test generator 660 commits the test patterns generated at 675 to test the fabricated IC chip 104. The test patterns generated by the delay test generator 630 can be provided to a fault reporter 650. The fault reporter 650 can execute operations related to fault reporting. More particularly, at 685, the fault reporter 650 can generate report fault statistics that characterize, for example data related to the cell-aware test patterns applied to the fabricated IC chip 104. Additionally, at 687, the fault reporter 650 can generate fault reports for the fault statistics and cell defect statistics.

A test vector engine 690 of the IC test engine 150 can aggregate and convert the test patterns generated by the delay test generator 630 and the cell-aware test generator 660 into a format consumable by the ATE 198 or other tools/machines such as simulation. In particular, at 695, the test vector engine 690 can write vectors that implement the test patterns 196 that are employable by the ATE 198 or the other tools/machines. The test patterns 196 can be stored, for example, on the memory 116 and/or at the ATE 198.

The ATE 198 stimulates inputs of the fabricated IC chip 104 as dictated by the test patterns 196 and the ATE 198 is configured to compare a measured output of the fabricated IC chip 104 with expected values stored in the test patterns 196. In case of mismatch, a failure log is generated by the ATE 198. At a subsequent time, this failure log can be converted into a format readable by the IC test engine 150 to analyze the cause of failures at the fabricated IC chip 104.

The boundary model test patterns generated by the delay test generator 630 and the cell-aware test patterns generated by the cell-aware test generator 660 that, in combination, form the test patterns 196 vary considerably based on the architecture of the IC design 108 by the fabricated IC chip 104 and the specific environment in which the fabricated IC chip 104 is designed to operate. By applying sim-shifting to certain two-cycle delay test patterns, these two-cycle delay test patterns are employable to test for multicycle faults/defects (both static and delay faults/defects) that would conventionally need a multicycle test pattern with at least three cycles in a capture window for detection, thereby improving the quality of the test patterns 196 by increasing the faults detected by application of the test patterns 196. Additionally, in this manner, the overall time needed for the ATE 198 to test the fabricated IC chip 104 can be reduced.

Figure 7:
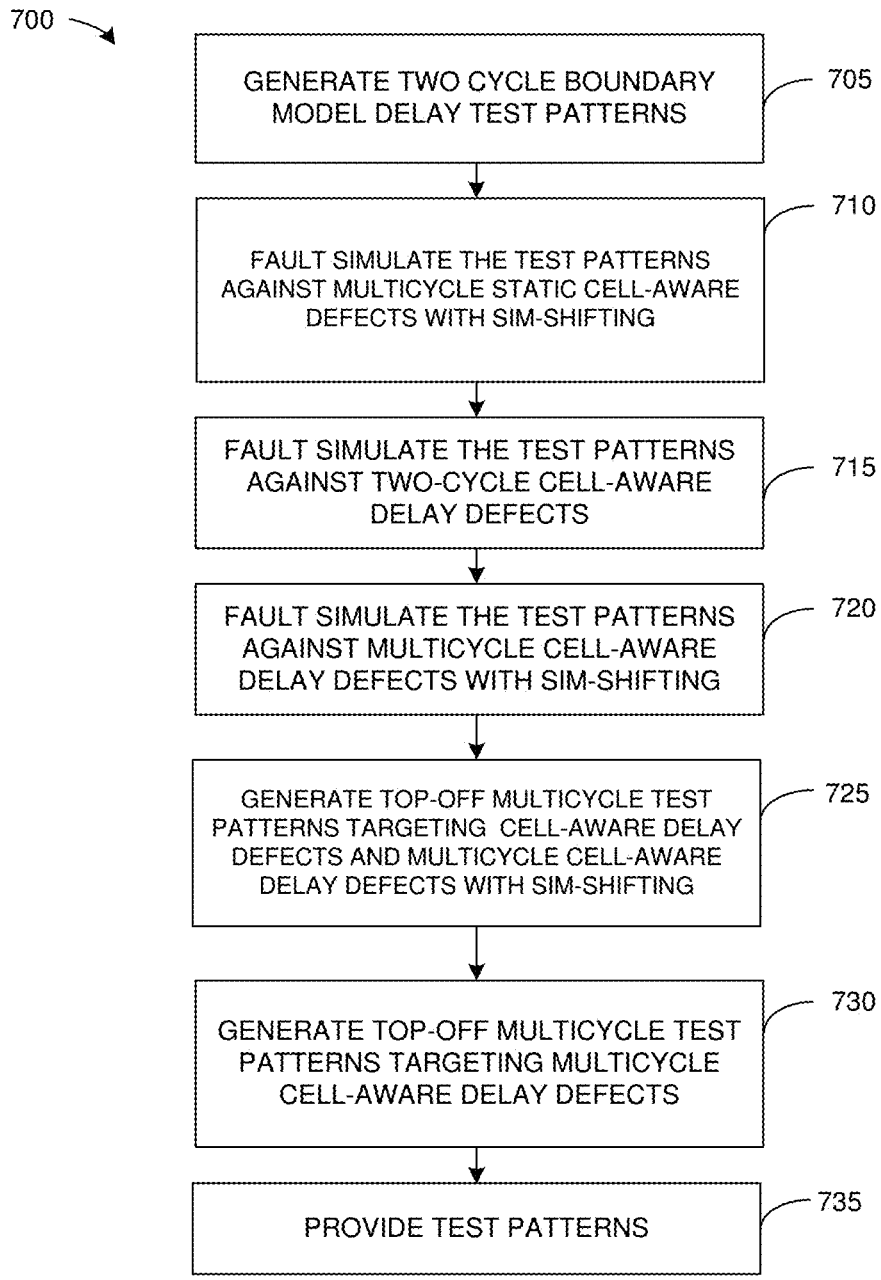
FIG. 7 illustrates a flowchart of an example method for generating test patterns for a fabricated IC chip.
Figure 8:
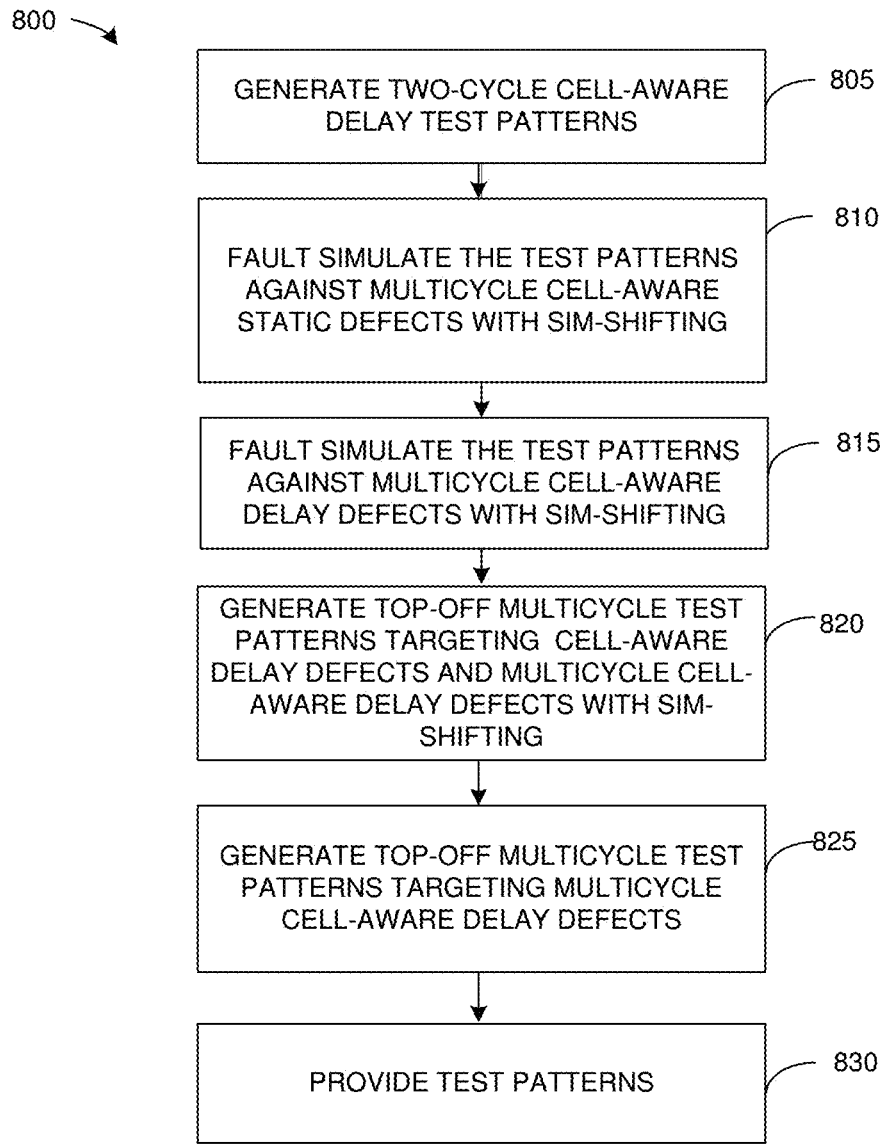
FIG. 8 illustrates a flowchart of another example method for generating test patterns for a fabricated IC chip.

In view of the foregoing structural and functional features described above, example methods will be better appreciated with reference to FIGS. 7 and 8. While, for purposes of simplicity of explanation, the example methods of FIGS. 7 and 8 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flowchart of an example method 700 for generating test patterns for testing a fabricated IC chip, such as the fabricated IC chip 104 of FIG. 1 that is based on an IC design, such as the IC design 108 of FIG. 1. The method 700 can be executed, for example by an IC test engine, such as the IC test engine 150 of FIG. 1. At 705, the IC test engine can generate a first set of test patterns using ATPG techniques. The first set of test patterns can include two-cycle boundary model test patterns. Each two-cycle delay test pattern of the first set of test patterns can target a particular two-cycle boundary model delay fault/defect in the fabricated IC chip. Stated more generally, the first set of test patterns target a set of multicycle faults/defects (e.g., two-cycle boundary model delay faults/defects).

At 710, the IC test engine employs a fault simulator (e.g., the fault simulator 190 of FIGS. 1 and 6) to fault simulate the first set of test patterns against other multicycle cell-aware static faults/defects with sim-shifting. The first set of test patterns are fault simulated such that the state of the IC design after at least the last two shift clock cycles of a scan-in shift window of each of the respective two-cycle delay test pattern of the plurality of two-cycle delay test patterns are fault simulated to provide two fault initialization cycles for detection of a multicycle delay fault and/or defect. The IC test engine can mark off the multicycle cell-aware static faults/defects that are detectable by the first set of test patterns, which are two-cycle boundary model test patterns targeting boundary model delay two-cycle faults/defects (e.g., as explained with respect to FIG. 5). At 715, the IC test engine can employ the fault simulator to fault simulate the first set of test patterns against two-cycle cell-aware delay faults/defects through sim-shifting. The static multicycle cell-aware delay faults/defects that are detectable with the first set of test patterns, which are two-cycle boundary model test patterns targeting two-cycle boundary model delay faults/defects, are marked off.

At 720, the IC test engine employs the fault simulator to fault simulate the first set of test patterns against multicycle cell-aware delay faults/defects in the IC design with sim-shifting. The IC test engine can mark off the multicycle cell-aware delay faults/defects that are detectable by the first set of test patterns, which are two-cycle boundary model test patterns targeting boundary model delay two-cycle faults/defects (e.g., as explained with respect to FIG. 5). Marking off the multicycle cell-aware static faults/defects (at 710), the two-cycle cell-aware delay faults/defects (at 715) and the multicycle cell-aware delay faults/defects (at 720) avoids unneeded generation of test patterns specifically targeting these faults/defects.

At 725, the IC test engine can generate a second set of test patterns using ATPG techniques. The second set of test patterns are top-off multicycle test patterns that target untested multicycle cell-aware delay faults/defects. Additionally, at 725, the IC test engine can employ the fault simulator to fault simulate the second set of test patterns against untested multicycle cell-aware delay faults/defects through sim-shifting (e.g., explained with respect to FIG. 5). At 730, the IC test engine can generate a third set of test patterns using ATPG techniques. The third set of test patterns can be multicycle test patterns that target untested cell-aware static multicycle patterns.

At 735, the IC test engine can aggregate the first set of test patterns, the second set of test patterns and the third set of test patterns to provide test patterns (e.g., the test patterns 196 of FIG. 1) to an ATE 198 that can apply the test patterns to the fabricated IC chip 104. By employing the method 700, the number of detectable faults/defects by a given set of test patterns in the fabricated IC chip is increased thereby reducing ATE 198 test time and increasing fault/defect detection quality.

FIG. 8 illustrates a flowchart of another example method 800 for generating test patterns for testing a fabricated IC chip, such as the fabricated IC chip 104 of FIG. 1 that is based on an IC design, such as the IC design 108 of FIG. 1. The method 800 can be executed, for example by an IC test engine, such as the IC test engine 150 of FIG. 1. At 805, the IC test engine can generate a first set of test patterns using ATPG techniques. The first set of test patterns can include two-cycle cell-aware test patterns. Each two-cycle delay test pattern of the first set of test patterns can target a particular two-cycle cell-aware delay fault/defect in the fabricated IC chip 104. Stated more generally, the first set of test patterns target a set of multicycle faults/defects (e.g., two-cycle cell-aware delay faults/defects).

At 810, the IC test engine employs a fault simulator (e.g., the fault simulator 190 of FIGS. 1 and 6) to fault simulate the first set of test patterns against other multicycle cell-aware static faults/defects in the IC design with sim-shifting. The first set of test patterns are fault simulated such that the state of the IC design after at least the last two shift clock cycles of a scan-in shift window of each two-cycle delay test pattern of the plurality of two-cycle delay test patterns are fault simulated to provide two fault initialization cycles for detection of a multicycle delay fault and/or defect. The IC test engine can mark off the multicycle cell-aware static faults/defects that are detectable by the first set of test patterns, which are two-cycle boundary model test patterns targeting boundary model delay two-cycle faults/defects (e.g., as explained with respect to FIG. 5).

At 815, the IC test engine employs the fault simulator to fault simulate the first set of test patterns against multicycle cell-aware delay faults/defects in the IC design with sim-shifting. The IC test engine can mark off the multicycle cell-aware delay faults/defects that are detectable by the first set of test patterns, which are two-cycle boundary model test patterns targeting boundary model delay two-cycle faults/defects (e.g., as explained with respect to FIG. 5). Marking off the multicycle single cycle cell-aware faults/defects (at 810) and the multicycle cell-aware delay faults/defects (at 815) avoids unneeded generation of test patterns specifically targeting these faults/defects.

At 820, the IC test engine can generate a second set of test patterns using ATPG techniques. The second set of test patterns are top-off multicycle test patterns that target untested multicycle cell-aware delay faults/defects. Additionally, at 820, the IC test engine can employ the fault simulator to fault simulate the second set of test patterns against untested multicycle cell-aware delay faults/defects through sim-shifting (e.g., explained with respect to FIG. 5). At 825, the IC test engine can generate a third set of test patterns using ATPG techniques. The third set of test patterns can be multicycle test patterns that target untested cell-aware static multicycle patterns.

At 830, the IC test engine can aggregate the first set of test patterns, the second set of test patterns and the third set of test patterns to provide test patterns (e.g., the test patterns 196 of FIG. 1) to an ATE 198 that can apply the test patterns to the fabricated IC chip 104. By employing the method 800, the number of detectable faults/defects in the fabricated IC chip is increased.

Figure 9:
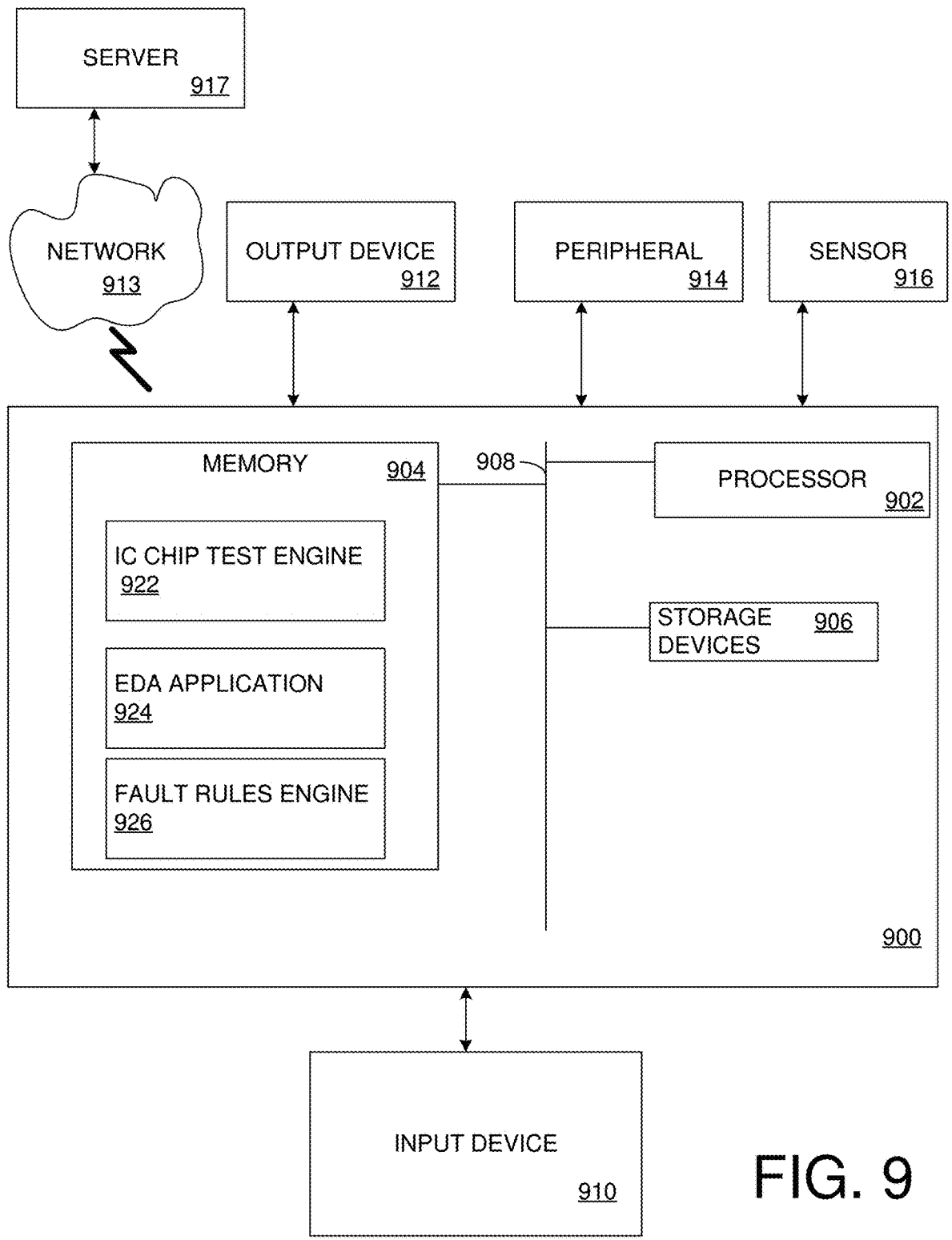
FIG. 9 illustrates an example of a computing system employable to execute an IC test engine and a fault rules engine.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 9, the computing system 900 can include a computer processor 902, associated memory 904 (e.g., RAM), cache memory, flash memory, etc.), one or more storage devices 906 (e.g., a solid state drive, a hard disk drive, an optical drive such as a compact disk (CD) drive or digital versatile disk (DVD) drive, a flash memory stick, etc.) and numerous other elements and functionalities. The computer processor 902 may be an IC chip for processing instructions. For example, the computer processor may be one or more cores, or micro-cores of a processor. Components of the computing system 900 can communicate over a data bus 908.

The computing system 900 may also include an input device 910, such as any combination of one or more of a touchscreen, keyboard, mouse, microphone, touchpad, electronic pen, or any other input device. Further, the computing system 900 can include an output device 912, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 912 can be the same physical device as the input device 910. In other examples, the output device 912 and the input device 910 can be implemented as separate physical devices. The computing system 900 can be connected to a network 913 (e.g., LAN, a wide area network (WAN) such as the Internet, a mobile network, or any other type of network) via a network interface connection (not shown). The input device 910 and output device(s) 912 can be connected locally and/or remotely (e.g., via the network 913) to the computer processor 902, the memory 904 and/or the storage devices 906. Many different types of computing systems exist, and the aforementioned input device 910 and the output device 912 can take other forms. The computing system 900 can further include a peripheral 914 and a sensor 916 for interacting with the environment of the computing system 900 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 900 can communicate with a server 917 via the network 913.

The memory 904 can include an IC test engine 922 to test an IC design that is instantiated as a fabricated IC chip. The IC design can be generated, for example, by an EDA application 924. The memory 904 can also include a fault rules engine 926 for generating fault rules files and/or DDMs to facilitate the testing of the fabricated IC chip.

Further, one or more elements of the aforementioned computing system 900 can be located at a remote location and connected to the other elements over the network 913. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine-readable instructions, the machine-readable instructions comprising:
an integrated circuit (IC) test engine that:
generates a plurality of two-cycle delay test patterns that target a first set of multicycle faults and/or defects of a fabricated IC chip based on an IC design, wherein each two-cycle delay test pattern includes a scan-in shift window operating at a test clock frequency, and a capture window with a launch cycle and a capture cycle operating at a functional clock frequency that is greater than the test clock frequency; and
fault simulates the plurality of two-cycle delay test patterns against a second set of multicycle faults and/or defects in the IC design utilizing sim-shifting, such that a state of the IC design after at least a last two shift clock cycles of the scan-in shift window of each two-cycle delay test pattern of the plurality of two-cycle delay test patterns are fault simulated to provide two fault initialization cycles for detection of a multicycle delay fault and/or defect of the second set of multicycle faults and/or defects.

2. The medium of claim 1, wherein a given two-cycle delay test pattern of the plurality of two-cycle delay test patterns enables detection of a given multicycle cell-aware delay fault and/or defect of the second set of multicycle cell-aware delay faults and/or defects.

3. The medium of claim 2, wherein the launch cycle of the given two-cycle delay test pattern causes an output value of a first scan flop of the IC design that is upstream of a given two-cycle fault and/or defect to transition from a first value to a second value, and the capture cycle of the given two-cycle delay test pattern causes a second scan flop of the IC design to record the output value, wherein the second scan flop is an observable scan flop that is downstream from the given two-cycle fault and/or defect.

4. The medium of claim 3, wherein fault simulation of the given two-cycle delay test pattern includes assertion of a scan-enable signal during the scan-in shift window of the given two-cycle delay test pattern and de-assertion of the scan-enable signal during the capture window of the given two-cycle delay test pattern that includes the capture cycle.

5. The medium of claim 4, wherein the IC test engine re-asserts the scan-enable signal at an end of the capture window to transition to a scan out shift window, and clock cycles during the scan out shift window operate at the test frequency.

6. The medium of claim 2, wherein the first set of multicycle faults and/or defects are a set of multicycle boundary model delay faults and/or defects, such that the given two-cycle delay test pattern of the plurality of two-cycle delay test patterns enables detection of a given multicycle boundary model delay fault and/or defect of the set of multicycle boundary model delay faults and/or defects.

7. The medium of claim 2, wherein the second set of multicycle faults and/or defects are a set of multicycle cell-aware delay faults and/or defects.

8. The medium of claim 2, wherein the given multicycle fault and/or defect of the second set of multicycle faults and/or defects detectable by the given two-cycle delay test pattern is a missing contact for a transistor.

9. The medium of claim 2, wherein the given multicycle cell-aware fault is alternatively detectable with a three-cycle or more test pattern that includes three or more cycles in the capture window operating at the functional clock frequency.

10. The medium of claim 9, wherein the IC test engine marks off the given multicycle fault and/or defect and the given multicycle cell-aware fault and/or defect from further test pattern generation.

11. The medium of claim 2, wherein:
the IC test engine generates a plurality of top-off multicycle test patterns that target untested multicycle delay fault and/or defects in the IC design utilizing sim-shifting, wherein a given top-off multicycle test pattern of the plurality of top-off multicycle test patterns enables detection of another multicycle delay fault and/or defect of the untested multicycle delay faults and/or defects.

12. The medium of claim 11, wherein the other multicycle fault and/or defect is a multicycle cell-aware delay fault and/or defect.

13. The medium of claim 11, wherein the other multicycle fault and/or defect is a multicycle boundary model delay fault and/or defect.

14. The medium of claim 1, wherein the first set of multicycle faults and/or defects are a set of multicycle cell-aware delay faults and/or defects detectable by the plurality of two-cycle delay test patterns and the second set of multicycle faults and/or defects include a set of multicycle cell-aware delay faults and/or defects which are detectable by delay test patterns with three or more clock cycles, and wherein a given multicycle cell-aware delay fault and/or defect of the second set of multicycle faults and/or defects is detectable by a given two-cycle delay test pattern of the plurality of two-cycle delay test patterns with sim-shifting.

15. A system comprising:
a non-transitory memory that stores machine-readable instructions; and
a processing unit that accesses the memory and executes the machine-readable instructions, the machine-readable instructions comprising:
an integrated circuit (IC) test engine that:
generates a plurality of two-cycle delay test patterns that target a first set of multicycle faults and/or defects of a fabricated IC chip based on an IC design, wherein each two-cycle delay test pattern includes a scan-in shift window operating at a test clock frequency, and a capture window with a launch cycle and a capture cycle operating at a functional clock frequency that is greater than the test clock frequency; and
fault simulates the plurality of two-cycle delay test patterns against a second set of cell-aware multicycle faults and/or defects in the IC design that are based on a plurality of fault rules files for the IC design utilizing sim-shifting such that a state of the IC design after at least a last two shift clock cycles of the scan-in shift in window of each two-cycle delay test pattern of the plurality of two-cycle delay test patterns are fault simulated to provide two fault initialization cycles for detection of a multicycle delay fault and/or defect, wherein each of the plurality of fault rules files is associated with a respective cell type of a plurality of cell types in the IC design, and a given two-cycle delay test pattern of the plurality of two-cycle delay test patterns is sim-shifted to enable detection of a given multicycle delay fault and/or defect of the second set of cell-aware multicycle faults and/or defects.

16. The system of claim 15, wherein the launch cycle of the given two-cycle delay test pattern causes an output value of a first scan flop of the IC design that is upstream of the given two-cycle fault and/or defect to transition from a first value to a second value, and the capture cycle of the given two-cycle delay test pattern causes a second scan flop of the IC design to record the output value, wherein the second scan flop is an observable scan flop that is downstream from the given multicycle fault and/or defect.

17. The system of claim 15, wherein the first set of multicycle faults and/or defects are a set of multicycle cell-aware delay faults and/or defects detectable by the plurality of two-cycle delay test patterns and the second set of multicycle faults and/or defects include a set of multicycle cell-aware delay faults and/or defects which are detectable by delay test patterns with three or more clock cycles.

18. The system of claim 15, wherein the IC test engine further generates a plurality of top-off multicycle test patterns that target untested multicycle fault and/or defects in the IC design utilizing sim-shifting, wherein a given top-off multicycle test pattern of the plurality of top-off multicycle test patterns enables detection of another multicycle delay fault and/or defect of the untested multicycle defects.

19. A method for generating test patterns for testing a fabricated integrated circuit (IC) chip, the method comprising:

generating, by an IC test engine executing on a computing platform, a plurality of two-cycle delay test patterns that target a first set of multicycle faults and/or defects of a fabricated IC chip based on an IC design, wherein each two-cycle delay test pattern includes a scan-in shift window operating at a test clock frequency, and a capture window with a launch cycle and a capture cycle operating at a functional clock frequency that is greater than the test clock frequency; and fault simulating, by the IC test engine, the plurality of two-cycle delay test patterns against a second set of multicycle faults and/or defects in the IC design utilizing sim-shifting such that a state of the IC design after at least a last two shift clock cycles of the scan-in shift in window of each two-cycle delay test pattern of the plurality of two-cycle delay test patterns are fault simulated to provide two fault initialization cycles for detection of a multicycle delay fault and/or defect, wherein a given two-cycle delay test pattern of the plurality of two-cycle delay test patterns is sim-shifted to enable detection of a given multicycle delay fault and/or defect of the second set of multicycle faults and/or defects.

20. The method of claim 19, wherein the launch cycle of the given two-cycle delay test pattern causes an output value of a first scan flop of the IC design that is upstream of the given two-cycle fault and/or defect to transition from a first value to a second value, and the capture cycle of the given two-cycle delay test pattern causes a second scan flop of the IC design to record the output value, wherein the second scan flop is an observable scan flop that is downstream from the given multicycle fault and/or defect.

* * * * *